US009182098B2

(12) United States Patent  
Caldwell et al.

(10) Patent No.: US 9,182,098 B2
(45) Date of Patent: Nov. 10, 2015

(54) DEVICE FOR SCATTERING LIGHT

(71) Applicant: Venntis Technologies LLC, Holland, MI (US)

(72) Inventors: David Wayne Caldwell, Holland, MI (US); Justin Teitt, Holland, MI (US)

(73) Assignee: VENNTIS TECHNOLOGIES LLC, Holland, MI (US)

( * ) Notice: Subject to any disclaimer, the term of this patent is extended or adjusted under 35 U.S.C. 154(b) by 135 days.

(21) Appl. No.: 14/031,525

(22) Filed: Sep. 19, 2013

(65) Prior Publication Data

US 2014/0078746 A1    Mar. 20, 2014

Related U.S. Application Data

(60) Provisional application No. 61/702,792, filed on Sep. 19, 2012, provisional application No. 61/702,794, filed on Sep. 19, 2012.

(51) Int. Cl.
*F21V 5/00* (2015.01)
*F21V 13/04* (2006.01)
*F21K 99/00* (2010.01)
*F21S 9/02* (2006.01)
*F21V 7/00* (2006.01)
*F21L 4/00* (2006.01)
*F21Y 101/02* (2006.01)
*F21V 29/00* (2015.01)

(52) U.S. Cl.
CPC ............... *F21V 5/006* (2013.01); *F21K 9/135* (2013.01); *F21K 9/50* (2013.01); *F21S 9/02* (2013.01); *F21V 5/00* (2013.01); *F21V 7/0091* (2013.01); *F21V 13/04* (2013.01); *F21L 4/00* (2013.01); *F21V 29/20* (2013.01); *F21Y 2101/02* (2013.01)

(58) Field of Classification Search
USPC ...................................... 362/311.02
See application file for complete search history.

(56) References Cited

U.S. PATENT DOCUMENTS

| | | |
|---|---|---|
| 5,959,316 A | 9/1999 | Lowery |
| 6,350,041 B1 | 2/2002 | Tarsa et al. |
| 7,279,346 B2 | 10/2007 | Andrews et al. |
| 7,775,685 B2 | 8/2010 | Loh |
| 7,798,678 B2 * | 9/2010 | Destain .................... 362/311.02 |
| 7,915,627 B2 | 3/2011 | Li |
| 7,928,456 B2 | 4/2011 | Andrews et al. |
| 7,976,186 B2 | 7/2011 | Loh |
| 8,154,043 B2 | 4/2012 | Andrews et al. |

(Continued)

OTHER PUBLICATIONS

Lily Li; Patents compete for priority in the remote-phosphor LED technology space; LEDs Magazine; Jul. 2012; 3 pages; PennWell Corporation; Tulsa, OK, USA.

(Continued)

*Primary Examiner* — Laura Tso
(74) *Attorney, Agent, or Firm* — McGarry Bair PC

(57) ABSTRACT

A device for scattering light emitted from at least one light source includes, among other things, a light coupler configured for placement adjacent to the light source. The light coupler includes a first region proximal the light source where the first region has a first index of refraction and a second region abutting the first region to define a boundary therebetween. Being distal to the light source, the second region has a second index of refraction that is greater than the first index of refraction. Light emitted from the light source is scattered as a result of travelling through the first region and the second region.

19 Claims, 21 Drawing Sheets

(56) References Cited

U.S. PATENT DOCUMENTS

| | | |
|---|---|---|
| 8,167,463 B2 | 5/2012 | Loh |
| 2003/0198046 A1 | 10/2003 | Cleaver et al. |
| 2004/0113163 A1 | 6/2004 | Steigerwald et al. |
| 2005/0201118 A1* | 9/2005 | Godo .......................... 362/555 |
| 2008/0121917 A1 | 5/2008 | Weisbuch et al. |
| 2009/0173958 A1 | 7/2009 | Chakraborty et al. |
| 2010/0026727 A1 | 2/2010 | Bita et al. |
| 2010/0091491 A1* | 4/2010 | Jiang et al. .................... 362/235 |
| 2011/0267836 A1 | 11/2011 | Boonekamp et al. |
| 2012/0051066 A1* | 3/2012 | Koo et al. ................ 362/311.02 |

OTHER PUBLICATIONS

Hye Lyun Park, International Search Report, Dec. 26, 2013, 4 pages, Daejeon Metropolitan City, Republic of Korea.

* cited by examiner

DEVICE FOR SCATTERING LIGHT

CROSS REFERENCE TO RELATED APPLICATIONS

This application claims the benefit of U.S. Provisional Application Ser. No. 61/702,792 filed Sep. 19, 2012 and U.S. Provisional Application Ser. No. 61/702,794 filed Sep. 19, 2012, which are incorporated herein by reference in their entirety.

BACKGROUND

An incandescent light bulb 10 as shown in FIG. 1 is an electric lamp that produces light by heating a filament wire 12 typically made of tungsten to a high temperature by passing an electric current through it. The hot filament 12 is protected from oxidation with a glass or quartz bulb 14 that is filled with inert gas or evacuated. The light bulb 10 is supplied with electrical current by terminals 16 in the glass. Most bulbs are mounted in a socket 18 to provide mechanical support, electrical connections and a standard by which it may be easily used in many applications. The most commonly used light bulb for general purpose lighting is the A19 bulb where the term "A19" encodes the width of the bulb at its widest point. The socket of the "A19" bulb is typically an Edison socket which includes a conventional screw base. The incandescent lamp is widely used in consumer and commercial lighting, for portable lighting such as table lamps, car headlamps, and flashlights, and for decorative and advertising lighting.

However, incandescent bulbs are much less efficient than most other types of lighting; most incandescent bulbs convert less than 5% of the energy they use into visible light whereas the remaining energy is converted into heat. The luminous efficacy of a typical incandescent bulb is 16 lumens per watt, compared to a range of 46 to 200 lm/W of a light-emitting diode (LED) lamp. Incandescent bulbs also have short lifetimes compared with other types of lighting; around 1000 hours for home light bulbs versus a range of 25,000 to 100,000 hours for LED lamps. Because of these inefficiencies, incandescent light bulbs are gradually being replaced in many applications by other types of electric lights, such as fluorescent lamps, compact fluorescent lamps (CFL), cold cathode fluorescent lamps (CCFL), high-intensity discharge lamps, and light-emitting diode lamps (LED). Some jurisdictions, such as the European Union, are in the process of phasing out the use of incandescent light bulbs.

FIG. 2 illustrates a typical LED-based lighting device 20 using an LED module 22 for replacing the standard A19 incandescent light bulb comprising a light lens 24, a heat sink and power supply enclosure 26 and an Edison socket 28. The LED module 22 that is used in LED-based lighting devices 20 predominately provides a Lambertian distribution. Because LEDs do not emit light in all directions, the directional characteristic of the output light is a major design consideration for LED lamps.

US20110215707 entitled "Constrained Folded Path Resonant White Light Scintillator" discloses an optical emitter 30 that can enable a more efficient disbursement of light by a light source such as an LED. Referring now to FIG. 3, (copy of FIG. 1 of patent application Ser. No. 12/716,337 entitled "Constrained Folded Path Resonant White Light Scintillator"), the optical emitter 30 includes a first conic reflector 32 that further includes an optical element 38 for defining an aperture for passing light into the optical emitter 30 from an LED. The optical emitter 30 includes a second conic reflector 34 opposite the first reflector 32 for collimating light admitted through the aperture. A volumetric light conversion element 36 between the first and second reflectors converts light from a first wavelength to a second, longer wavelength and then emits the converted light. The light conversion element 36 is substantially solid and includes an annular outer surface 37 through which light emits from the optical emitter 30 in a generally toroidal pattern. The light conversion element 36 can include phosphor dispersed in resin.

FIG. 4 illustrates the optical emitter 30 of FIG. 3 mounted on an LED-based lighting device 40 similar to that shown in FIG. 2. The optical emitter 30, along with a light lens 24, a heat sink and power supply enclosure 26 and an Edison socket 28 provide an alternative to the standard A19 incandescent light bulb. The subsequent distribution of light (i.e. the toroidal distribution) emitted from the optical emitter 30 may be less focused and more evenly distributed spherically than that of a typical LED-based lamp.

BRIEF SUMMARY

One aspect of the invention relates to a device for scattering light emitted from one or more light sources. The device includes a volumetric optical unit configured to couple to the at least one light source. The volumetric optical unit has a first region disposed to be proximal to the at least one light source, the first region having a first index of refraction; and a second region disposed to be distal to the at least one light source, abutting the first region at a boundary therebetween. The second region has a reflecting medium or a reflector or a second index of refraction that is different from the first index of refraction. With this structure, light rays emitted from a light source will be scattered as they travel through the first region or the second region or across the boundary.

Another aspect of the invention relates to a device for scattering light emitted from one or more light sources. The device has a first region disposed to be proximal to the light source. The first region has a first index of refraction, and an arcuate outer surface in which the arcuate outer surface is concave with respect to the light source. The device further includes a reflector disposed on at least a portion of the arcuate outer surface of the first region. With this structure, light emitted from the light source is scattered as a result of travelling through the first region and impinging on the reflector disposed on the outer surface of the first region.

DETAILED DESCRIPTION

Figure 5:
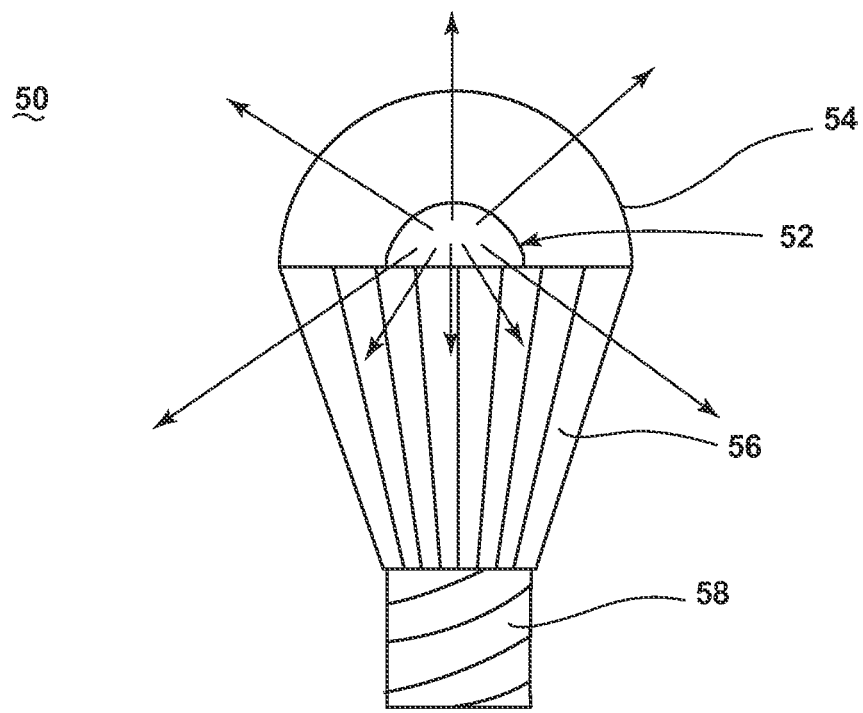
FIG. 5 illustrates a volumetric optical unit mounted to a socket according to an embodiment of the present invention.

The present invention is provided to maximize the scattering and disbursement of light from a light source or series of light sources. FIG. 5 illustrates a lighting device 50, using a volumetric optical unit 52 according to the present invention, for replacing the standard A19 incandescent light bulb or current LED-based alternatives comprising a light lens 54, a heat sink and power supply enclosure 56 and an Edison socket 58. As will be described below, the volumetric optical unit 52 (of which the upper portion may be seen in FIG. 5) may provide a generally isotropic or spherical distribution of light by control of the amount of refraction and reflection inherent to the structure of the volumetric optical unit 52. The redirection and, ultimately, the scattering of light from light sources is designed into the volumetric optical unit 52 by utilizing reflection and refraction at boundaries, including in some embodiments a mismatch of the index of refraction between or among optical materials integrated into the volumetric optical unit 52 and/or surrounding the volumetric optical unit 52.

Figure 6:
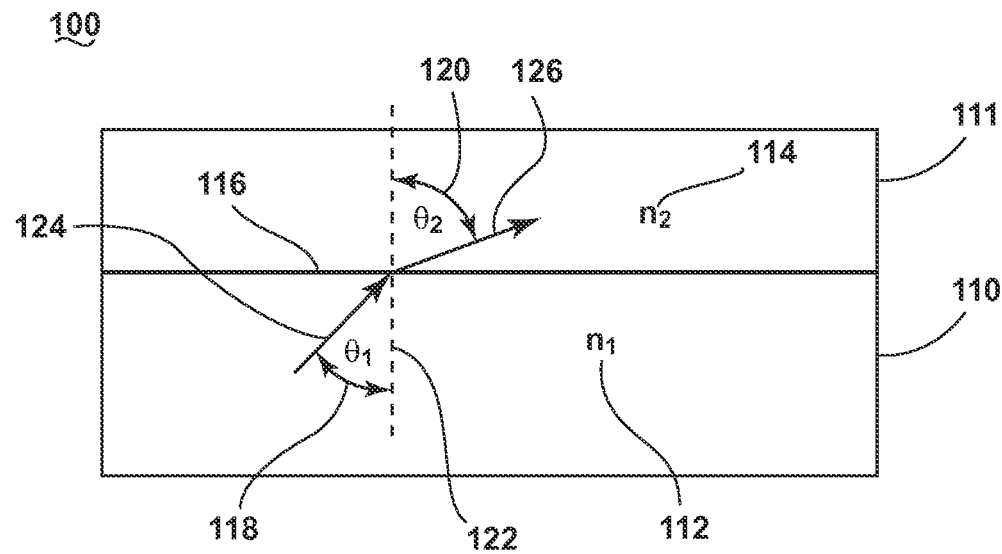
FIG. 6 illustrates the basic principle of Snell's law that determines the refraction (bending) of light based on incident angles of light from a light source or a series of light sources.

Snell's law characterizes the reflection and refraction of light when impinging on an interface between two volumes of differing indices of refraction. FIG. 6 illustrates the basic principle of Snell's law 100 that can be used to determine the refraction of light based on incidence angles of light from a light source or a series of light sources. In FIG. 6, $n_1$ and $n_2$ are the indices of refraction 112, 114 for two different media 110, 111 adjoined at the interface boundary 116 and $\theta_1$ 118 and $\theta_2$ 120 are the angles of incidence and refraction with respect to the normal 122 to the interface boundary 116. When a light ray 124 meets the interface boundary 116 at a given angle of incidence $\theta_1$ 118, the light ray 126 will refract and exit on the opposite side of incidence of the boundary 116 at an angle of refraction $\theta_2$ 120 defined by Snell's law. If the light ray originates in the higher index material, $\theta_2$ 120 will tend to be greater (relative to the normal 122, 90 degrees) with the relationship of:

$$\sin(\theta_1)*n_1=\sin(\theta_2)*n_2$$

$$\sin(\theta_2)=n_1*\sin(\theta_1)/n_2$$

$$\theta_2=\arcsin[n_1*\sin(\theta_1)/n_2]$$

When $\theta_2$ reaches 90 degrees, $\theta_1$ is said to be at the critical angle and can be calculated as:

$$\theta_1=\arcsin[n_2*\sin(\theta_2)/n_1]=\arcsin[n_2/n_1]$$

Figure 7:
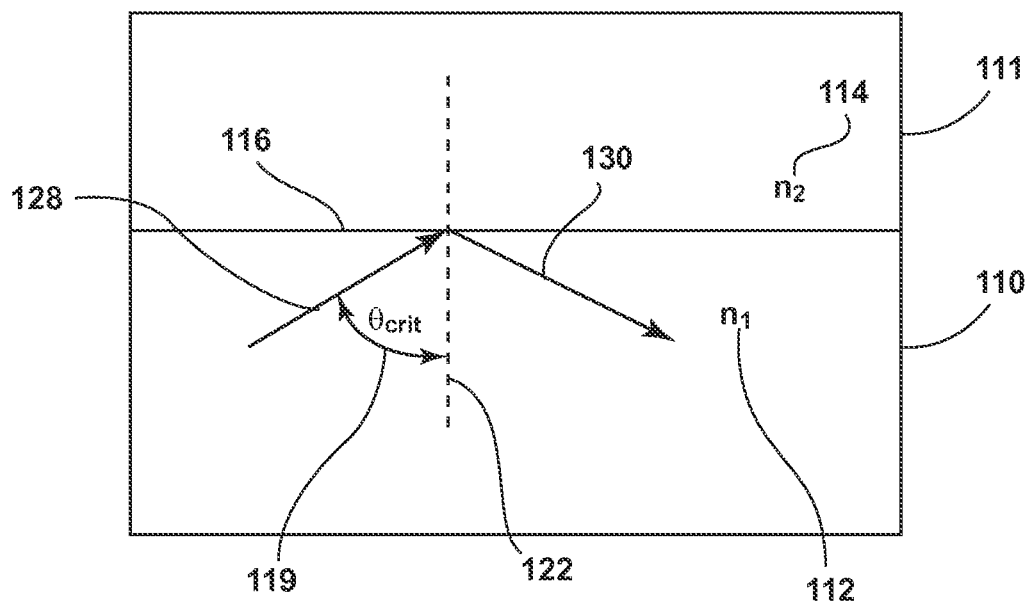
FIG. 7 illustrates a condition of Snell's law depicted in FIG. 7 where an incidence angle will cause incident light to totally reflect within a material.

As illustrated in FIG. 7, $\theta_{crit}$ is the critical angle of which if the incident angle 119 is greater will cause the incident light 128 to completely reflect 130 within the $n_1$ 112 material of the medium 110. This is referred to as total internal reflection.

Figure 8:
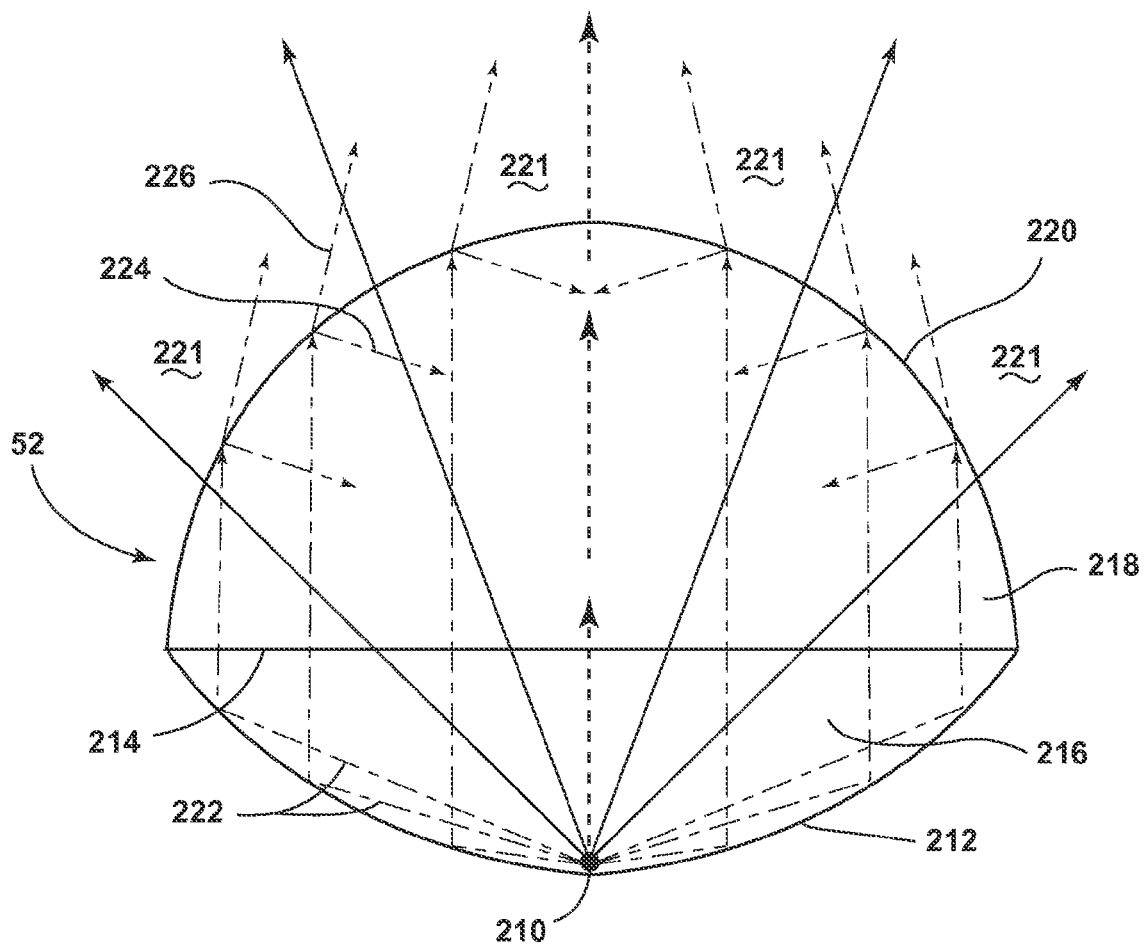
FIG. 8 illustrates an implementation of the volumetric optical unit of FIG. 5 that could be used to change the direction of light from a light source according to an embodiment of the invention.

FIG. 8 illustrates the volumetric optical unit 52 from FIG. 5 and demonstrates how the structure manipulates the direction of light from the light source 210. The light source 210 may be a single element such as an LED, an incandescent light source, or an aperture that allows the light to enter the volumetric optical unit interior 220. To enable efficient coupling of the light from the light source 210 to the volumetric optical unit interior 220, the light source 210 may be adjacent to or embedded within the volumetric optical unit interior 220.

The volumetric optical unit interior 220 may comprise one or more materials configured to make two distinct regions or volumes 216, 218. Proximal to the light source 210, the first region 216 may be formed of a material having a first index of refraction. Abutting the first region 216 to define a boundary 214 therebetween and distal to the light source 210, the second region 218 may be formed of a material having a second index of refraction. At least one material in the volumetric optical unit interior 220 may be selected to match the material of the light source 210. For example, if the light source 210 were an LED, the selected material for the first region 216 may have a relatively high index of refraction to match the index of refraction for the material of which LED's are typically constructed.

The first region 216 may have an arcuate outer surface adjacent or surrounding the light source 310. The arcuate surface may form a reflector for reflecting light emitted from the light source 310 towards the second region 218. Depending upon the implementation, the reflector disposed on the arcuate surface of the first region 216 may be parabolic in cross-section. In this way, the reflector may be configured to collimate light impinging on the reflector in a generally parallel fashion toward the second region 218.

The two indices of refraction of the first region 216 and second region 218 may be the same or different depending upon the implementation. In one embodiment, the second index of refraction is less than or equal to the first index of refraction but in other embodiments the second index of refraction may be equal to or greater than the first index of refraction in order to increase the net distribution of light by optimizing reflection and/or refraction. As an example, the first region 216 may be formed of a high index optical material to be complementary to the light source 210 and the second region 218 may be a different material with a different index of refraction, or it may be a void with air. The first index of refraction may range from about 1.30 and lower to about 1.41 for silicones, and from about 1.54 to about 1.59 and higher for epoxies. The second index of refraction may range from about 1.00 for air to about 1.59 and higher for epoxies.

Some of the light from the light source 210 will be reflected off the reflector 212 as shown with light rays 222 and then directed across the boundary 214 separating the two regions 216, 218. As illustrated in FIG. 8, other rays of light 226, 224 originating from the light source 210 may be refracted (light ray 226) or reflected (light ray 224) at the boundary of the volumetric optical unit interior 220 and an outer medium 221 such as air. Subsequent reflections inside the volumetric optical unit interior 220 will result in light rays refracting across the boundary of the volumetric optical unit interior 220 and the outer medium 221.

Figure 1:
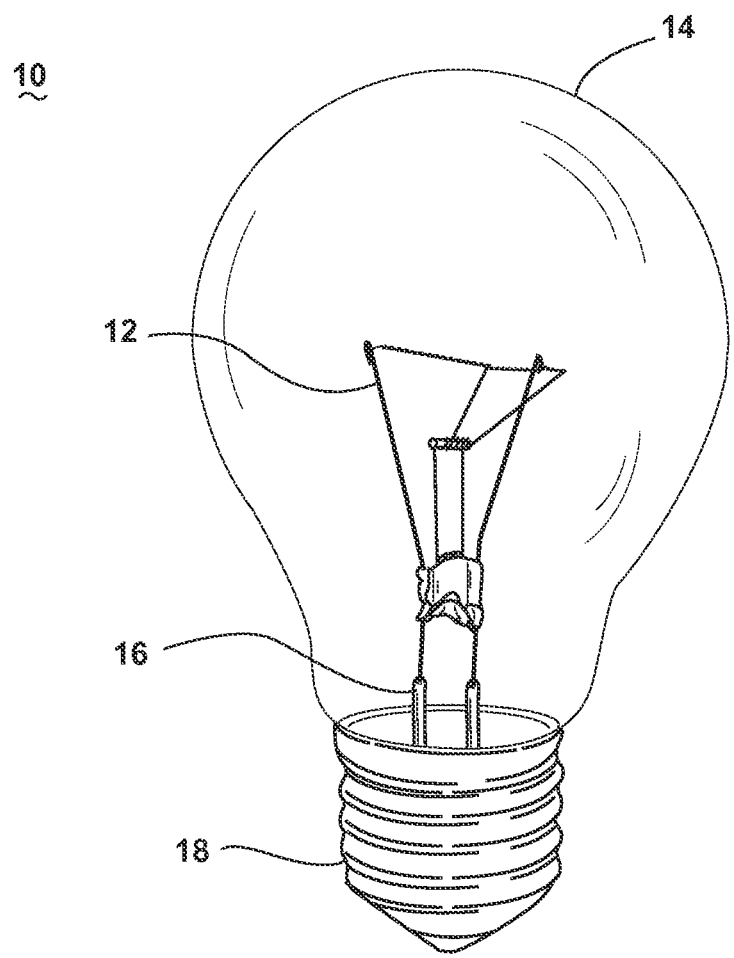
FIG. 1 illustrates a conventional prior art incandescent light bulb mounted to a socket.
Figure 2:
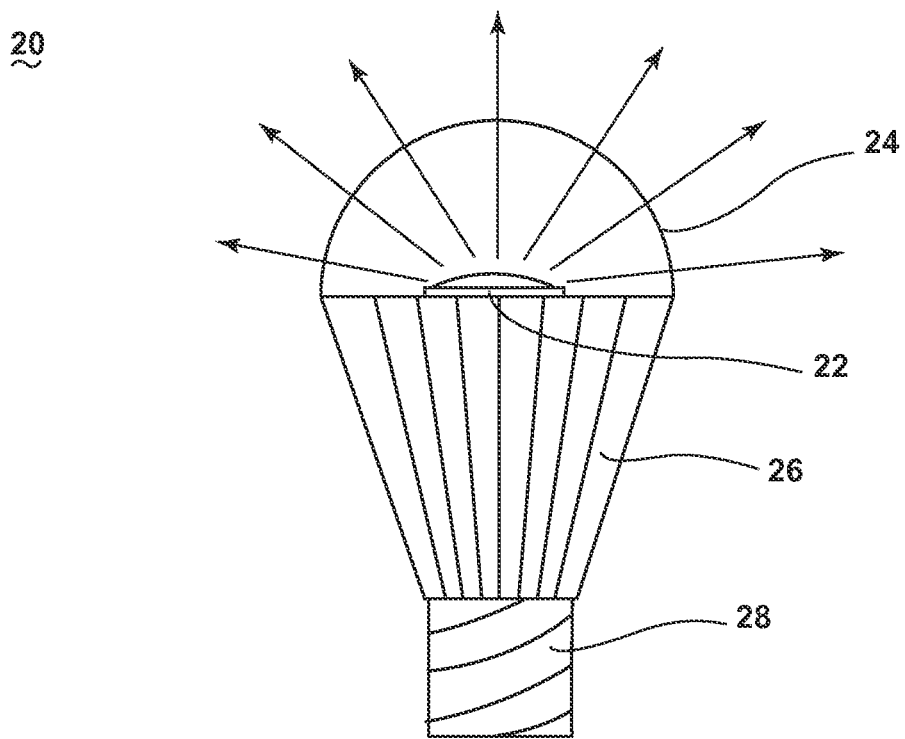
FIG. 2 illustrates a prior art typical lighting device using a LED module for replacing standard A19 incandescent light bulb.

The nature of the material or materials within the volumetric optical unit interior 220 is selected to allow the light to efficiently move towards the next interface such as the reflector 212 or the boundary 214 between the regions 216, 218 or the boundary condition between the air and the volumetric optical unit interior 220. Additionally, the overall shape of the volumetric optical unit interior 220 and the relative values of the indices of refraction between the two regions 216 and 218 determine the light distribution pattern output from the volumetric optical unit 52 into the surrounding medium 221. It is one goal of the invention to output a highly spherical (or isotropic) light distribution from the volumetric optical unit 52 when coupled with an LED light source 210. To that effect, internally reflected light rays 224 contribute to the isotropic nature of the output scattered light by impinging the boundary between the volumetric optical unit 52 into the surrounding medium 221 at a wide distribution of incidence angles. As shown in FIG. 8, the second region 218 may be formed with an arcuate outer surface. Other shapes are contemplated and will be described below, but in general, the outer surface of the second region 218 is selected to enable scattering of light to form a more isotropic illumination pattern for the volumetric optical unit 52. An additional objective is to scatter the light by minimizing the mean free path of any light ray. The longer the mean free path of any light ray and the more reflections said light ray undergoes, the more attenuation the light ray will exhibit in the volumetric material and at the reflection surfaces thereby reducing the light output and, ultimately, the efficiency of the device. The smaller the optical unit dimensionally, the more reflections there will be per mean free path of a given light ray and therefore greater attenuation. This will tend to necessitate larger volumes than smaller volumes for the volumetric optical unit 52. It is an important aspect of this invention to spread and scatter the light and minimize the mean free path. Also the size of the light source 210 will have an effect on the volume of the volumetric optical unit 52 and therefore the height of the device. Also, the height of regions 216, 218 will tend to require an increase as the size of the light source 210 is increased in dimension and volume. Also, just as in an incandescent light as shown in FIG. 1, if the final emission of light is generated at a height that is greater than the width of the base there will be more downlight inherently generated by the device. This same attribute is true for the volumetric optical unit 52. As the volume in region 218 is made greater by the increasing the height of the volumetric optical unit 52, the more downlight will be inherently generated that will pass the base formed by volume 216, One of the first and second regions 216, 218 may be made from a material comprising at least one of an epoxy or a silicone such as a MS-1003 Moldable Silicone manufactured by Dow Corning with corporate offices at 5300 11 Mile Road, Auburn, Mich. 48611.

The other of the first and second regions 216, 218 may be made from a material comprising at least one of air or an epoxy or a silicone such as a Sylgard 184 Silicone Elastomer manufactured by Dow Corning with corporate offices at 5300 11 Mile Road, Auburn, Mich. 48611.

Figure 9:
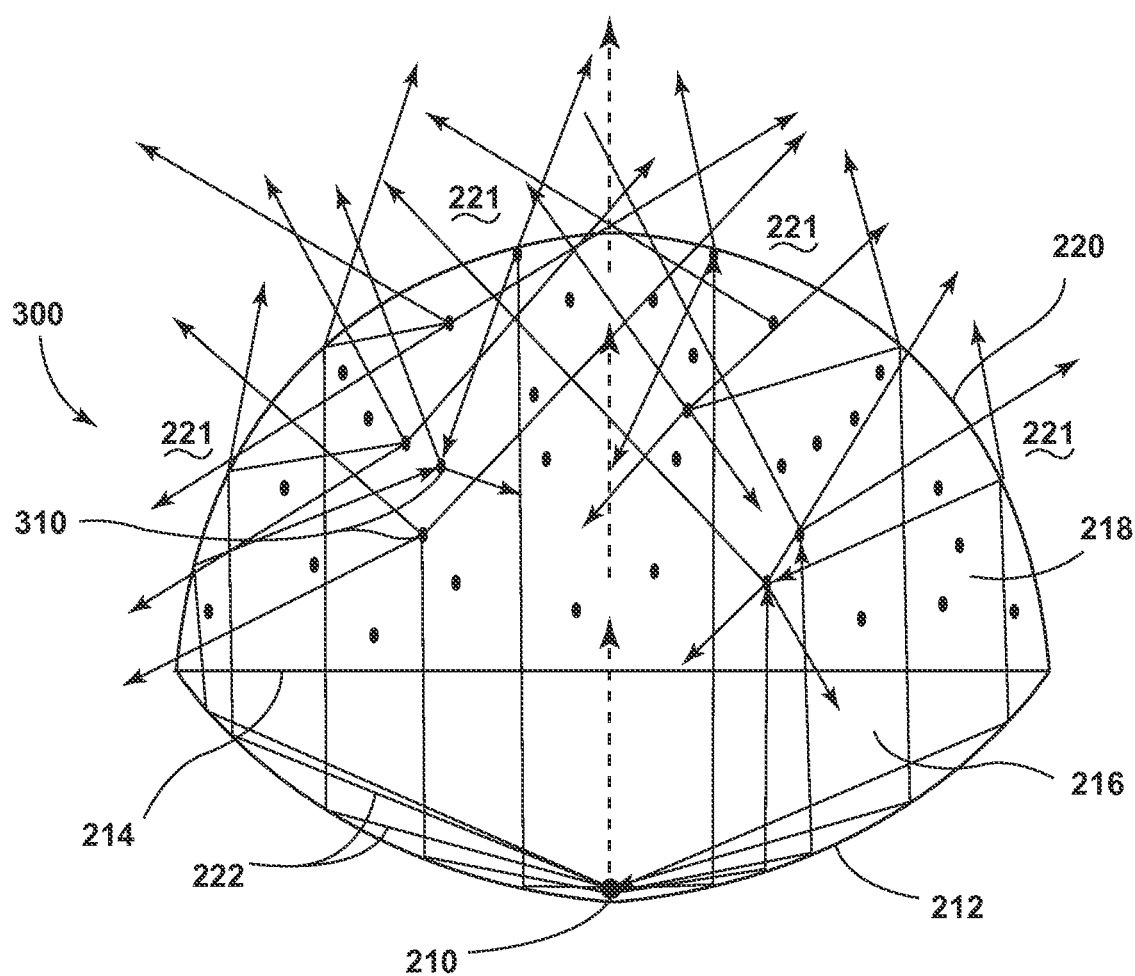
FIG. 9 illustrates a volumetric optical unit similar to that of FIG. 8 with the addition of a scattering medium according to another embodiment of the invention.

FIG. 9 illustrates a volumetric optical unit 300 similar to that illustrated in FIG. 8 with the addition of a scattering medium 310 according to another embodiment of the invention. The scattering medium 310 serves as an interference structure and causes the light to scatter in a more isotropic manner. The scattering medium 310 comprises a plurality of particles each of which has dimensions that are much smaller than the regions 216, 218 of the volumetric optical unit interior 220. The scattering medium 310 may be dispersed within at least one region 216, 218 of the volumetric optical unit interior 220. For example, as shown in FIG. 9, the scattering medium 310 is dispersed in only the second region 218 of the volumetric optical unit interior 220. Preferably, the dispersed scattering medium 310 may be uniformly distributed in the region, however other distributions are contemplated. For example, the scattering medium 310 may be distributed in a gradient such that the density of scattering media in the region is proportional to the distance from the light source 210.

The scattering medium 310 may be made of generally reflective materials or other materials such as down-converting phosphors, fluorescents, dyes, quantum dots, nano-particles, and other materials that have generally small features relative to the regions 216, 218 of the volumetric optical unit interior 220. The scattering medium 310 may be made of materials that change the wavelength of the light from the light source to a different wavelength. Alternatively, the scattering medium 310 may simply comprise small voids or bubbles in the volumetric optical unit interior 220 that may cause the impinging rays of light to change direction when passing through. The volumetric optical units described herein may be used to generate more than white light such as different color temperatures of white light as well as various light colors by using light sources that generate specific blackbody radiation, specific wavelengths as emitted by discrete wavelength devices such as LEDs or the mixing of light generated by multiple light sources including LEDs. A combination of down-conversion or up-conversion from light sources as described by utilizing phosphors, fluorescent materials, dyes, quantum dots, or nano-particles may be used to generate different spectra of light from below infrared to ultraviolet. Also by using reflective and other scattering media, the mixing and scattering of light may be enhanced by mixing reflective materials and other scattering materials into the volumetric optical unit 300.

An exemplary phosphor material may comprise less than two percent by weight of the volume of the second region. An exemplary phosphor material may have a particle size less than 50 μm, and it may even be smaller than 20 μm.

In addition to the scattering of the light rays from the light source 210 by way of reflection and refraction through the two regions 216, 218 and across the boundary 214 between the two regions 216, 218, the scattering medium 310 may cause the light to scatter such that the entirety of the region or regions in which the scattering medium 310 is dispersed acts as a plurality of light sources distributed throughout the volumetric optical unit interior 220. Additionally, light rays emitted from or refracted by the scattering medium 310 may impinge on additional particles of the scattering medium 310 further scattering the light. Consequently, the resulting distribution of output light may become more isotropic with the presence of the scattering medium 310.

Figure 10:
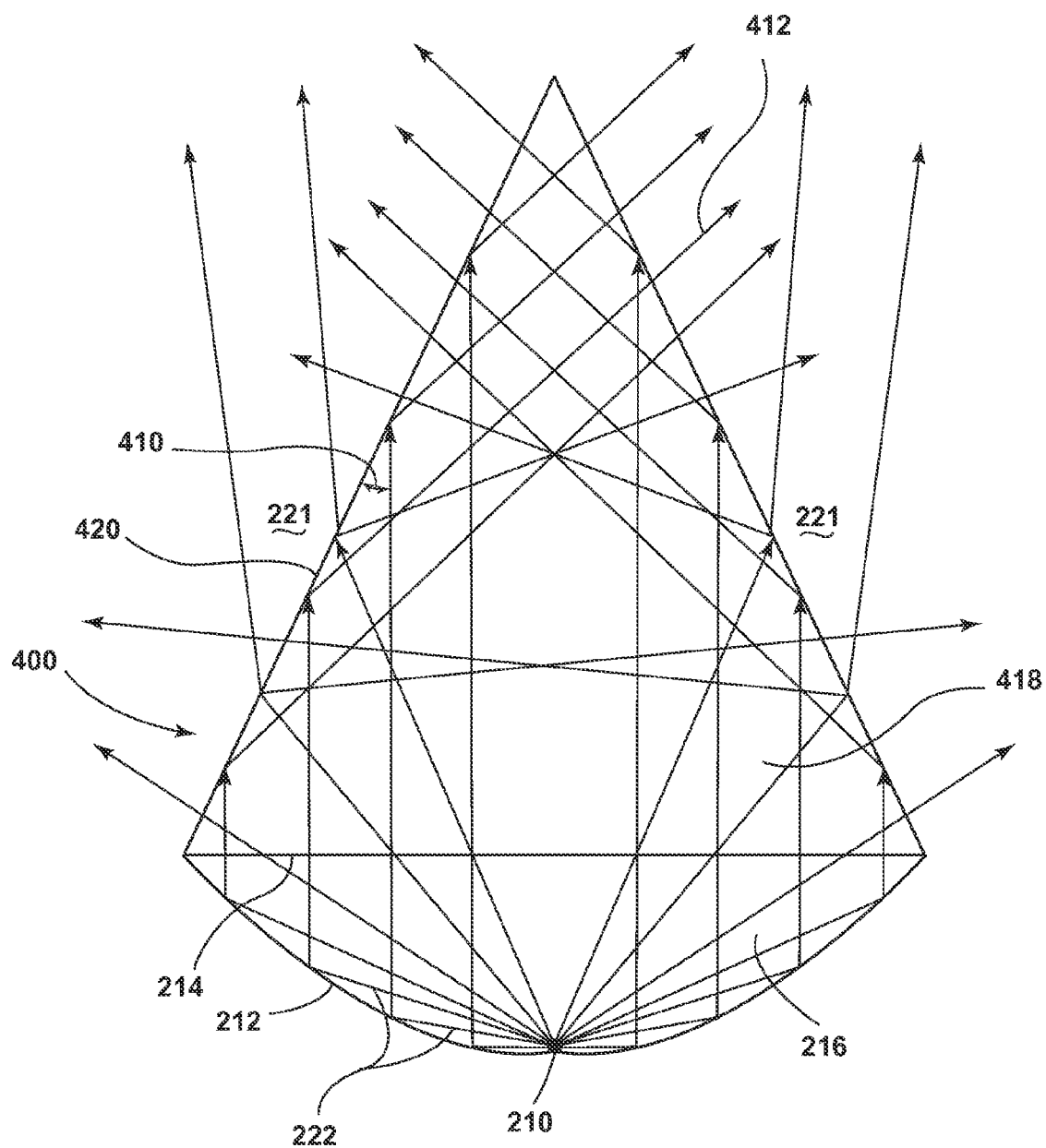
FIG. 10 illustrates a volumetric optical unit according to another embodiment of the invention.
Figure 11:
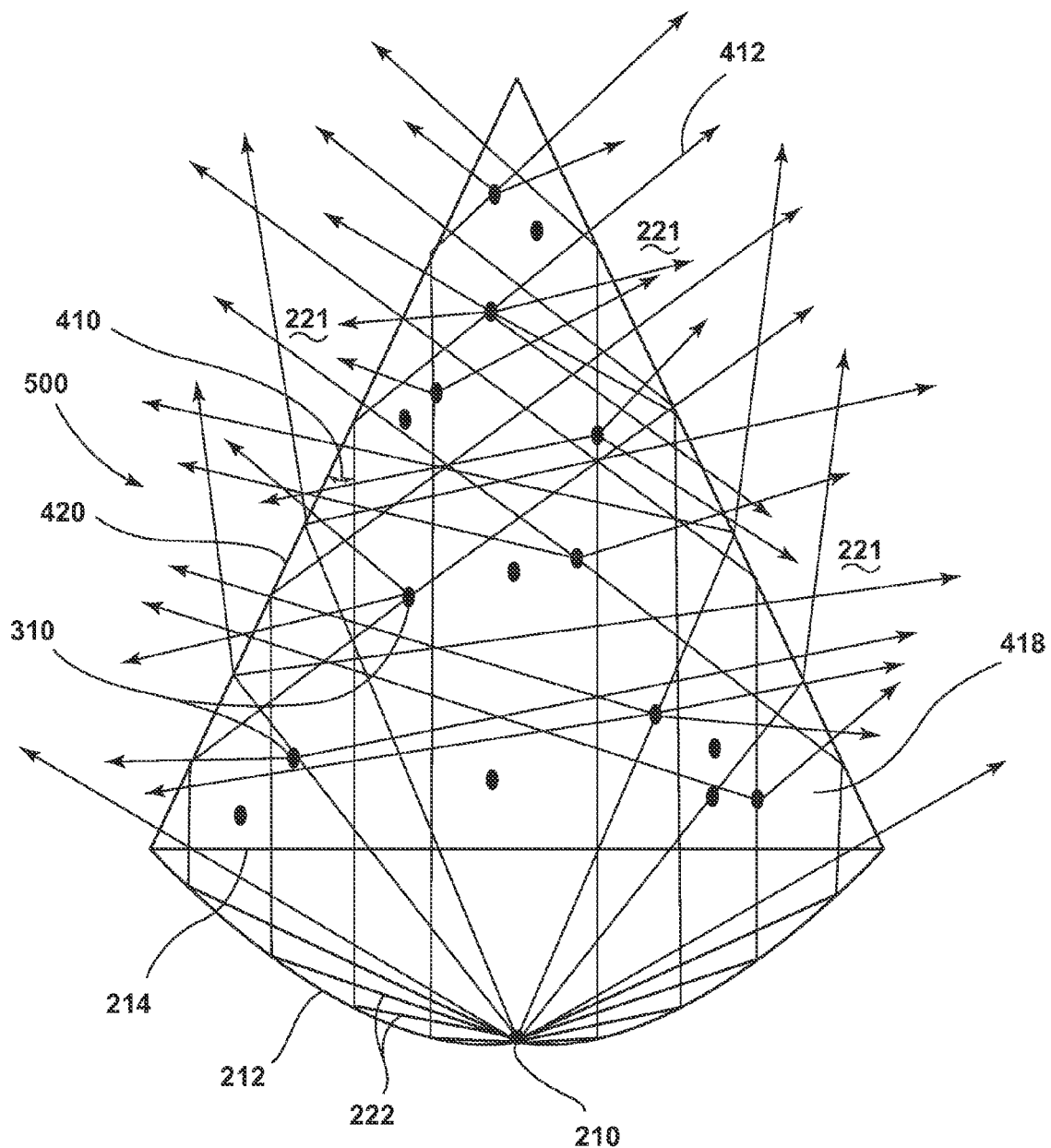
FIG. 11 illustrates a volumetric optical unit similar to that of FIG. 10 with the addition of a scattering medium according to another embodiment of the invention.

FIG. 10 illustrates a volumetric optical unit 400 according to another embodiment of the invention. The second region 418 has an inverted conical shape in which a base portion of the conical shape abuts the first region 216 at the boundary 214. The inverted conical shape of the second region 418 may increase the internal reflections by controlling the angle of the incident light at the boundary between the volumetric optical unit interior 420 and the external medium such as air. In this way, the angle of incidence is equal to or less than the critical angle 410 based on the ratio of indices of refraction of air and the volumetric optical unit interior 420. Consequently, as shown as an example in FIG. 10, the critical angle 410 may be selected by design of the inverted conical shape of the second region 418 and the index of refraction of the second region 418 such that all light rays 222 initially collimated by the reflector 212 along the arcuate surface in first region 216 are initially internally reflected at the boundary between the second region 418 and the air. Then, the light ray 412 may impinge and pass across the boundary at a second location. FIG. 11 illustrates a volumetric optical unit 500 similar to that described in FIG. 10 with the addition of the scattering media 310 as described previously to increase the amount of scattering of light.

Figure 12:
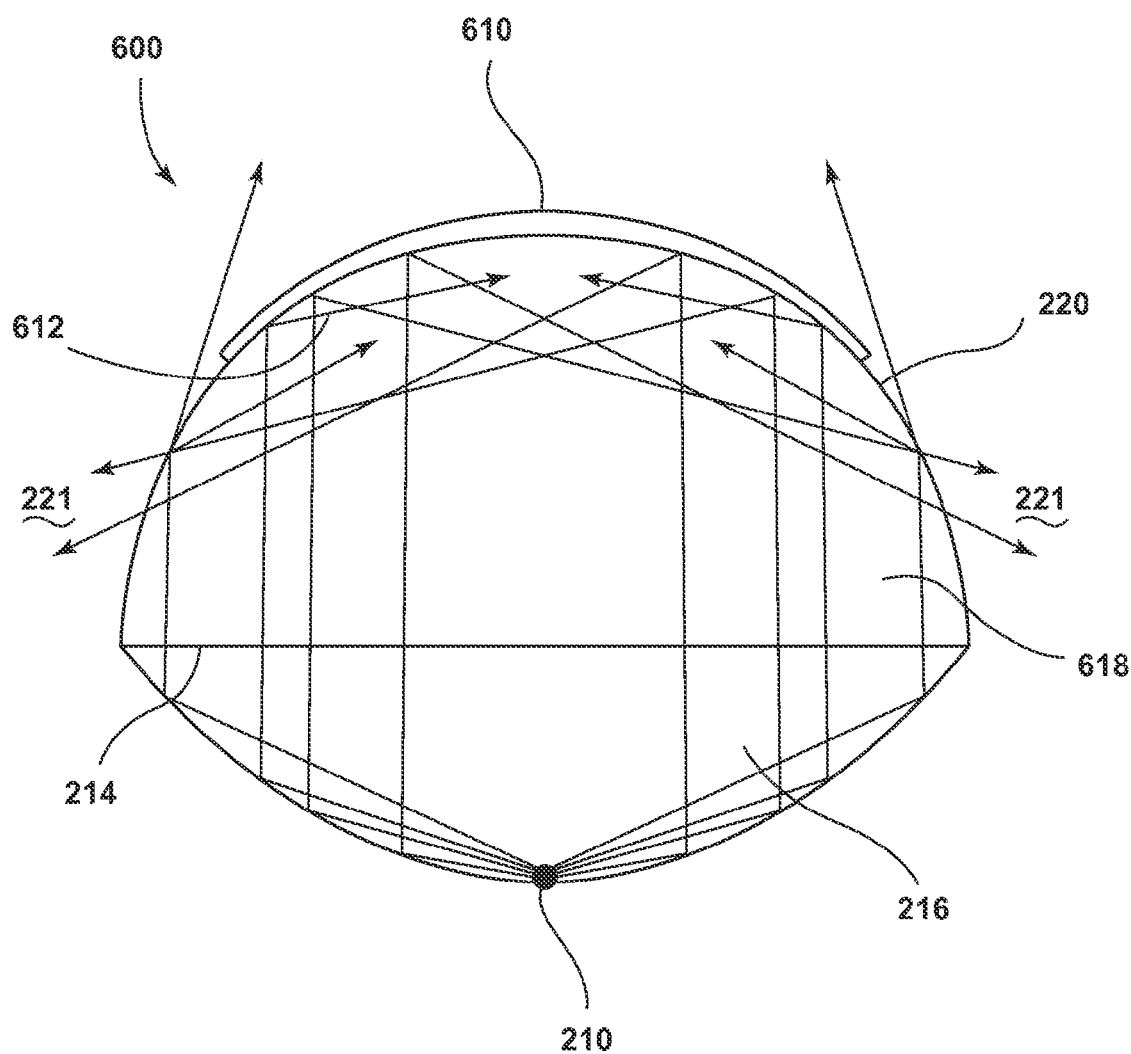
FIG. 12 illustrates a volumetric optical unit with a concave type reflector that would generally reflect light rays towards the center of the volumetric optical unit according to another embodiment of the invention.
Figure 13:
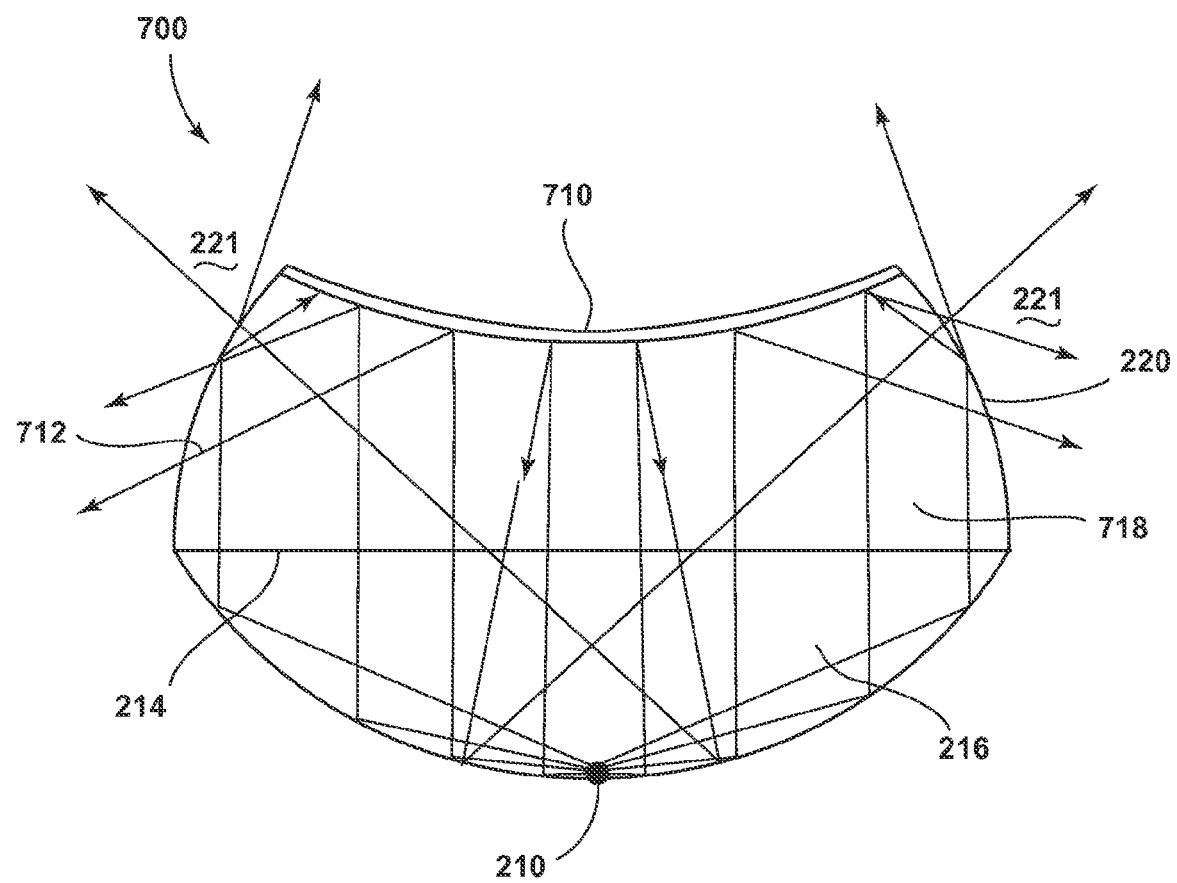
FIG. 13 illustrates a volumetric optical unit with a convex type reflector that would generally reflect light rays away from the center of the volumetric optical unit according to another embodiment of the invention.

While the volumetric optical units described above and illustrated in FIGS. 8-11 illustrate the use of one reflector 212 disposed along the arcuate outer surface of the first region 216 for reflecting light emitted from the light source toward the second region, additional reflective surfaces are contemplated. FIGS. 12-13 illustrate the attributes of described for FIGS. 8-11 with an additional top reflector disposed on a surface of the second region. Referring now to FIG. 12, a volumetric optical unit 600 may have a second region 618 with an arcuate outer surface in which the arcuate outer surface is concave with respect to light source 210. FIG. 12 illustrates a concave-type reflector 610 disposed on the surface of the second region 618 that may generally reflect incident light rays 612 towards the center of the optical unit. Similarly, referring to FIG. 13, a volumetric optical unit 700 may have a second region 718 with an arcuate outer surface in which the arcuate outer surface is convex with respect to light source 210. FIG. 13 illustrates a convex-type of reflector 710 disposed on the surface of the second region 718 that generally reflects the light rays 712 outwards and away from the center of the optical unit. In addition to the reflective elements described here, the volumetric optical units 600, 700 shown in FIGS. 12 and 13 respectively may incorporate any of the features discussed herein including the addition of a scattering medium into one or more of the regions of the volumetric optical unit interior 220.

Figure 14:
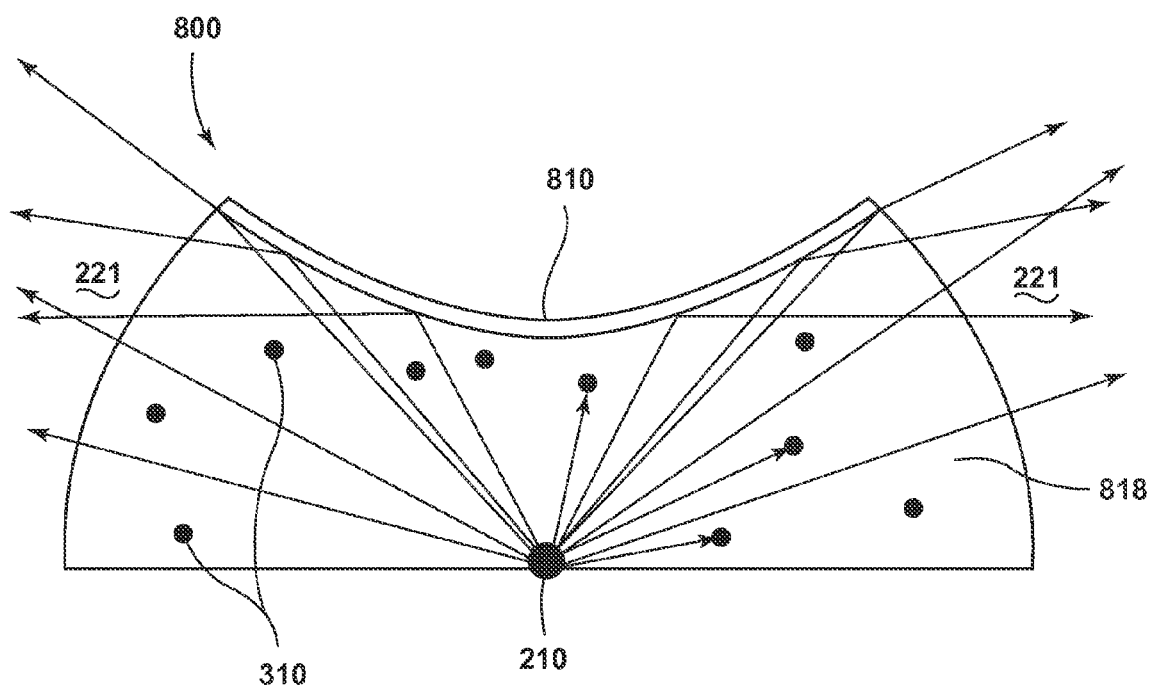
FIG. 14 illustrates a volumetric optical unit without a curved bottom reflector according to another embodiment of the invention.

FIG. 14 illustrates a volumetric optical unit 800 according to an embodiment of the invention without an integrated bottom reflector surrounding the light source 210. Therefore, the light rays do not move in parallel towards the top of the volumetric optical unit 800 away from the bottom as has been described previously. Instead, the volumetric optical unit 800 includes a first region 818 proximal to the light source 210. The first region 818 has an arcuate outer surface 812 that is concave with respect to the light source, and further includes a reflector 810 disposed on at least a portion of the arcuate outer surface 812 of the first region 818. As shown in FIG. 14, the reflector 810 is a convex-type reflector, though other reflector geometries including a concave-type reflector are contemplated.

Light emitted from the light source 210 is scattered, in part, as a result of travelling through the first region 818, impinging on the reflector 810 disposed on the outer surface of the first region 818 and changing direction via reflection. Other methods of scattering previously described, including by reflection and refraction at the boundary between the surface of the first region and the air and by interaction of light with a scattering medium 310 disposed in the first region 818 may contribute to the pattern of illumination emitted by the volumetric optical unit 800. In addition to the elements described here, the volumetric optical unit 800 shown in FIG. 14 may incorporate any of the features discussed herein.

Figure 15:
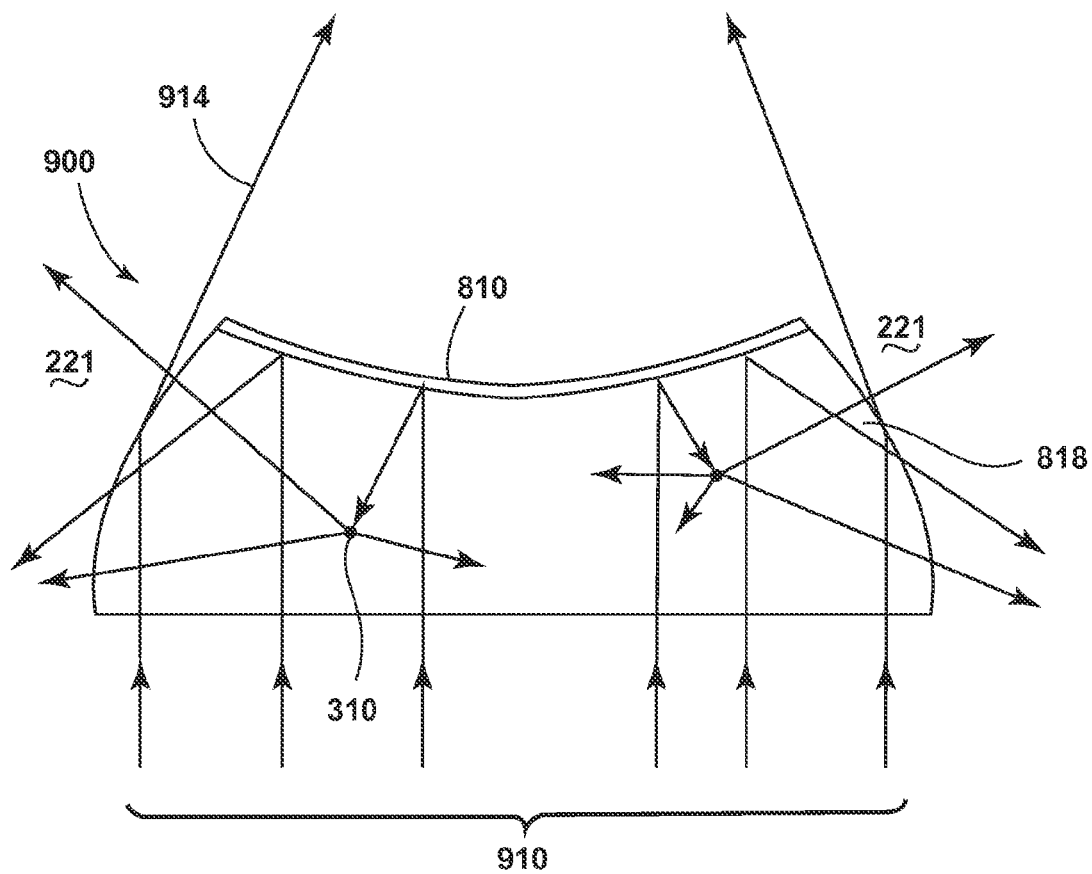
FIG. 15 illustrates a volumetric optical unit where substantially parallel light rays enters the unit from the bottom as a distributed source according to another embodiment of the invention.

FIG. 15 illustrates a volumetric optical unit 900 similar to that shown in FIG. 14 including the scattering medium 310 disposed in the first region 818 where substantially extended collimated light (represented as parallel light rays 910) impinge the unit from the bottom as a distributed light source according to another embodiment of the invention. While shown as a plurality of parallel light rays, the light entering the volumetric optical unit 900 need only to be spatially distributed; that is, the light may enter from the bottom of the unit with the light rays in a non-parallel orientation indicative of either a diverging or converging beam or may be scattered. The volumetric optical unit 900 may include a reflector 812, shown as a convex-type reflector. The light rays moving towards the top of the unit include light rays 914 refracted around the reflector 912. In addition to the elements described here, the volumetric optical unit 900 shown in FIG. 15 may incorporate any of the features discussed herein.

All of the volumetric optical units discussed so far naturally mix the light from the light source by the natural reflections based on the differences in index of refraction of the different materials within the structure and air or based on mixing from the reflection based on the reflectors or by a combination of both. If the light source were to consist of light from multiple light sources of different wavelengths, the light would then mix based on the inherent mixing characteristics in the volumetric optical materials in the structures described in FIGS. 8 through 15. As an example, the light source may consist of multiple LEDs with a variety of different wavelengths such as "blue", "red", and "green" which when mixed will create a "white" light. The color temperature of the "white" would be dependent on the intensity and wavelength of the different LEDs.

Also, if phosphors or other quantum converting material that absorb a particular wavelength and remit at a different wavelength are dispersed within the volumetric optical materials in the volumetric optical units described herein, then selection of multiple LEDs with multiple wavelengths that can be matched with the selection of phosphors or other quantum converting material to achieve a particular light output then the ability to achieve a maximum efficiency, lower cost, higher quality light output, with proper spectral content and light distribution may be achieved.

Figure 16:
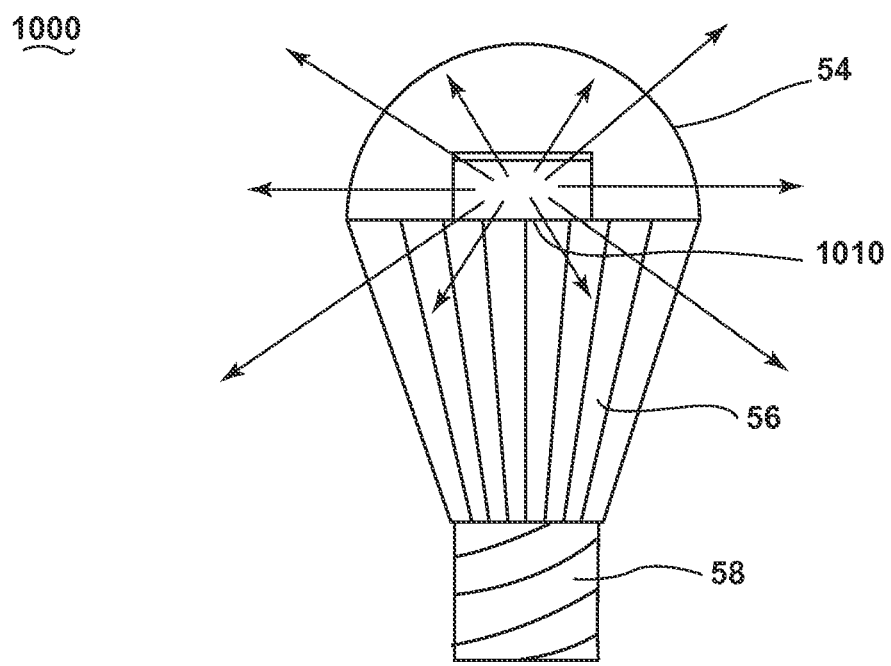
FIG. 16 illustrates a volumetric optical unit mounted to a socket according to another embodiment of the present invention.

Referring now to FIG. 16, any of the volumetric optical units described in FIGS. 8-15 may be integrated into a lighting device 1000 similar to that described in FIG. 5. By using a volumetric optical unit 1010 according to the present invention for replacing the standard A19 incandescent light bulb or current LED-based alternatives that include a light lens 54, a heat sink and power supply enclosure 56 and an Edison socket 58, an efficient illuminator that maximizes the scattering and disbursement of light from a light source or series of light sources may be realized.

Figure 17:
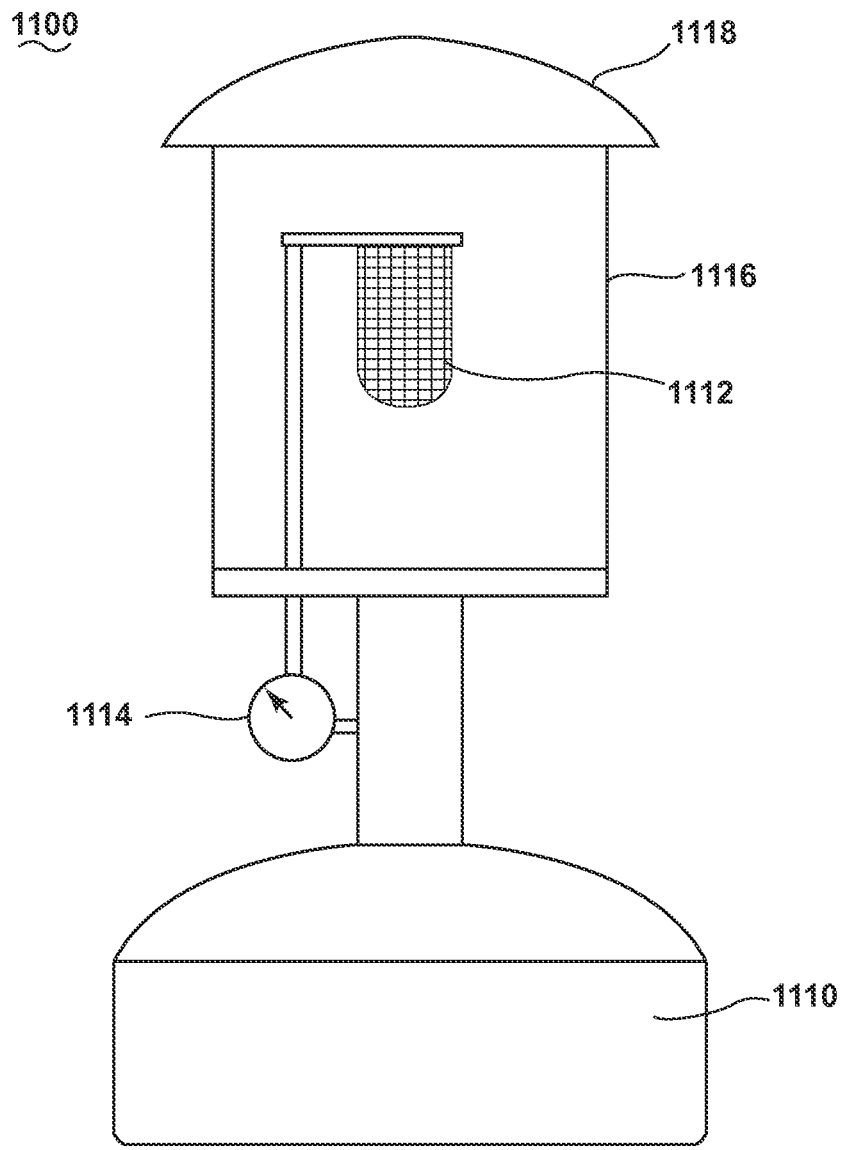
FIG. 17 illustrates a prior art camping lantern that uses a combustible liquid or gas fuel source which is burned to produce light via blackbody radiation.

When LED devices are advantageous to the use of portable lighting devices, all of the methods and structures described above may be used to provide for the use of LED lighting with outputs that are more generally isotropic. This is particularly true for camping lanterns as sold by the Coleman Company, Inc. with corporate offices at 3600 North Hydraulic, Wichita, Kans. 67219. Referring now to FIG. 17, a conventional camping fuel-burning lantern 1100 is a pressure lamp that generally includes a fuel source 1110 such as kerosene, naptha, propane etc, that when burning provides heat to a mantle 1112. The mantle 1112 generates a generally bright light when heated. A camping lantern generally includes controls 1114 for controlling the light output by regulating the burning of the fuel source 1110 and additionally includes an optically transparent enclosure 1116 and hood 1118. The appearance of the optical devices described above, and in the patent application Ser. No. 12/716,337 entitled "Constrained Folded Path Resonant White Light Scintillator" is very much alike, all of which provide light output in a generally similar way as the mantle 1112 in the standard fuel-burning lantern 1100. This familiar look is a distinguishing attribute that could be maintained, but with LED lighting. From an aesthetic standpoint, the products shown in FIGS. 18 through 20 emit light that look very similar to the light output provided by the mantle 1112 in the fuel-burning lantern 1100 illustrated in FIG. 17.

Figure 18:
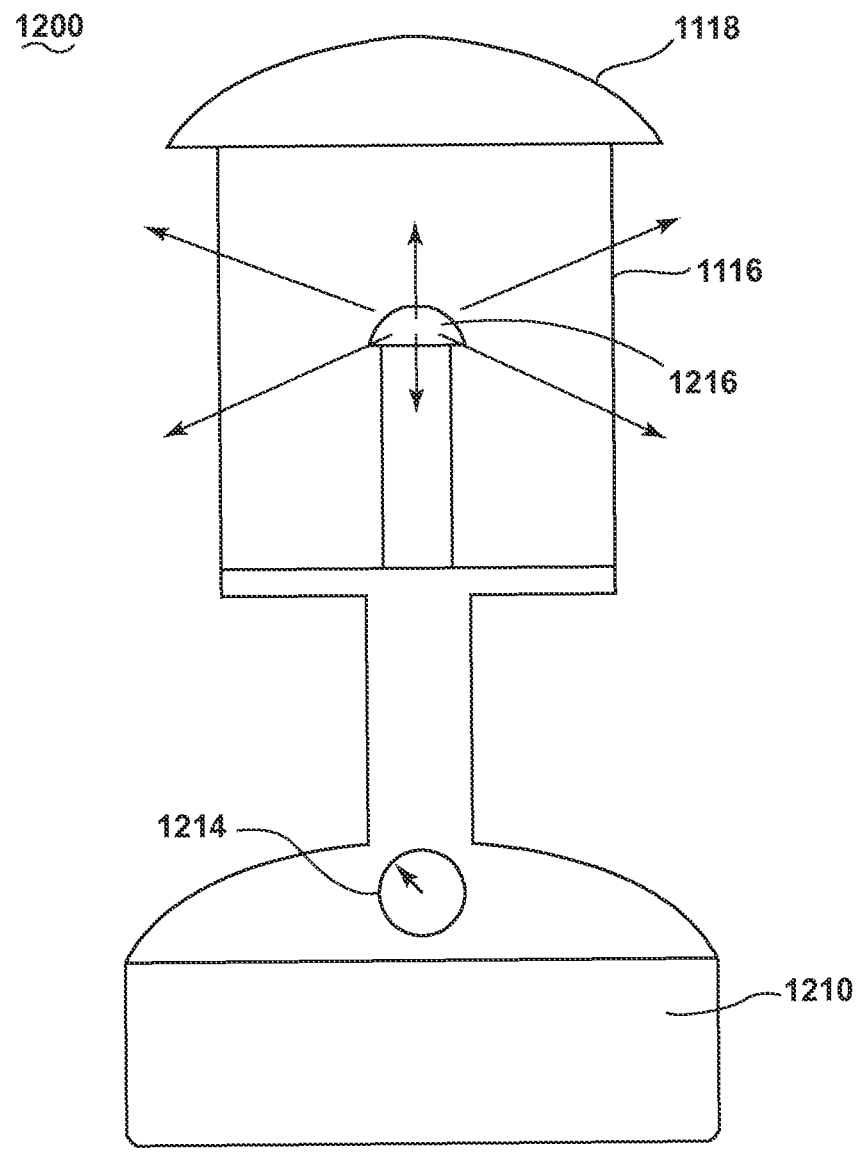
FIG. 18 illustrates a camping lantern with a volumetric optical unit according to an embodiment of the present invention.

FIG. 18 illustrates a camping lantern 1200 with a volumetric optical unit 1216 according to an embodiment of the present invention. The camping lantern 1200 includes a body 1210 that contains a battery compartment for the storage of a battery. The body 1216 is configured to interconnect the battery to a light source. The light source may be adjacent to or integrated into the volumetric optical unit 1216. The volumetric optical unit 1216 is a scattering device associated with the body in register with the light source. As described above the volumetric optical unit 1216 when configured for placement adjacent to the at least one light source has a first region proximal to the light source and the first region has a first index of refraction. The volumetric optical unit 1216 may have a second region abutting the first region with boundary defined therebetween. If provided, the second region may be distal to the light source and may have a second index of refraction that is greater than the first index of refraction. Light emitted from light source is scattered as a result of travelling through the first region and the second region, if provided. As shown in FIG. 18, the top portion of the volumetric optical unit previously described in FIGS. 8-11 is shown.

Additional elements may include a light control adjustment 1214 for controlling the electrical power supplied to the light source in the volumetric optical unit 1216 to vary the light intensity and in some cases the light color by varying the wavelength of the emitted light and an optional transparent enclosure 1116 and hood 1118. The transparent enclosure 1116 may be optional because the temperatures produced by the electric lighting (most generally LEDs) are much lower than that produced by a combustible fuel system with a mantle. The hood 1118 may be optional because the volumetric optical unit 1216 may be constructed as a sealed, molded subassembly protecting the electrical components thereby eliminating the need for a protective hood.

Figure 3:
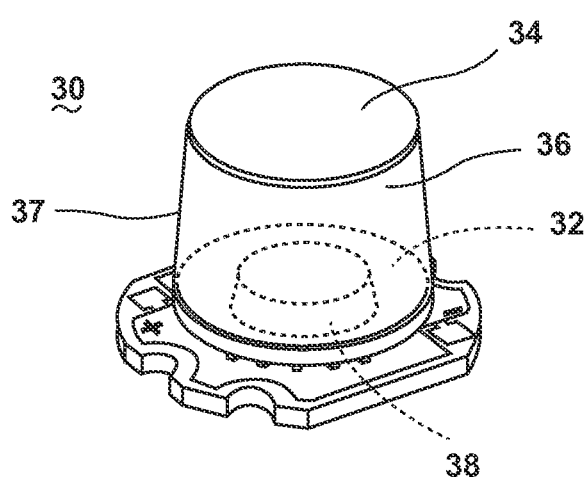
FIG. 3 illustrates a prior art optical unit that increases the efficiency of the distribution of light from a light aperture.
Figure 4:
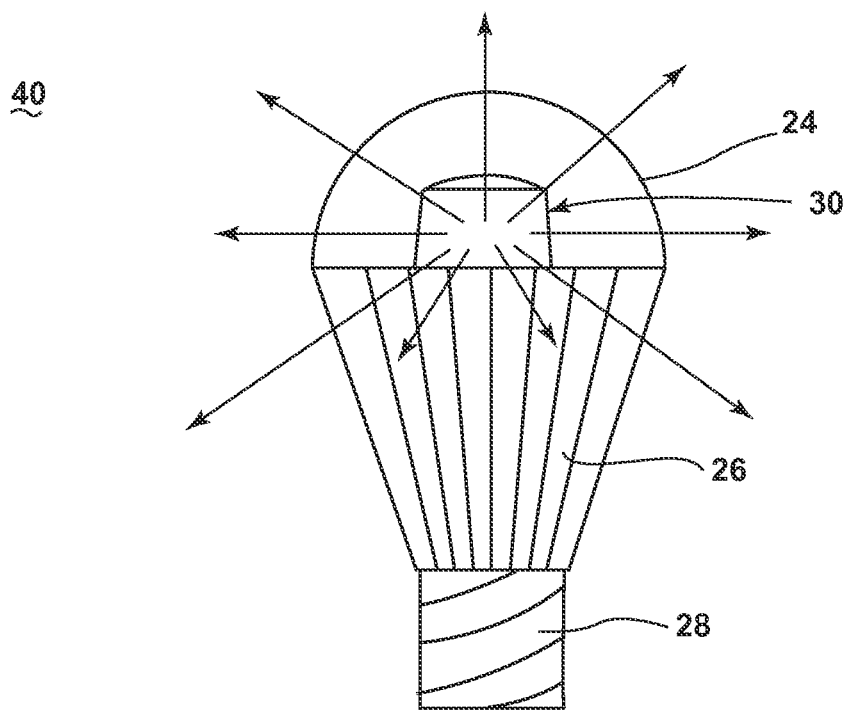
FIG. 4 illustrates the optical unit in FIG. 3 mounted to a socket.
Figure 19:
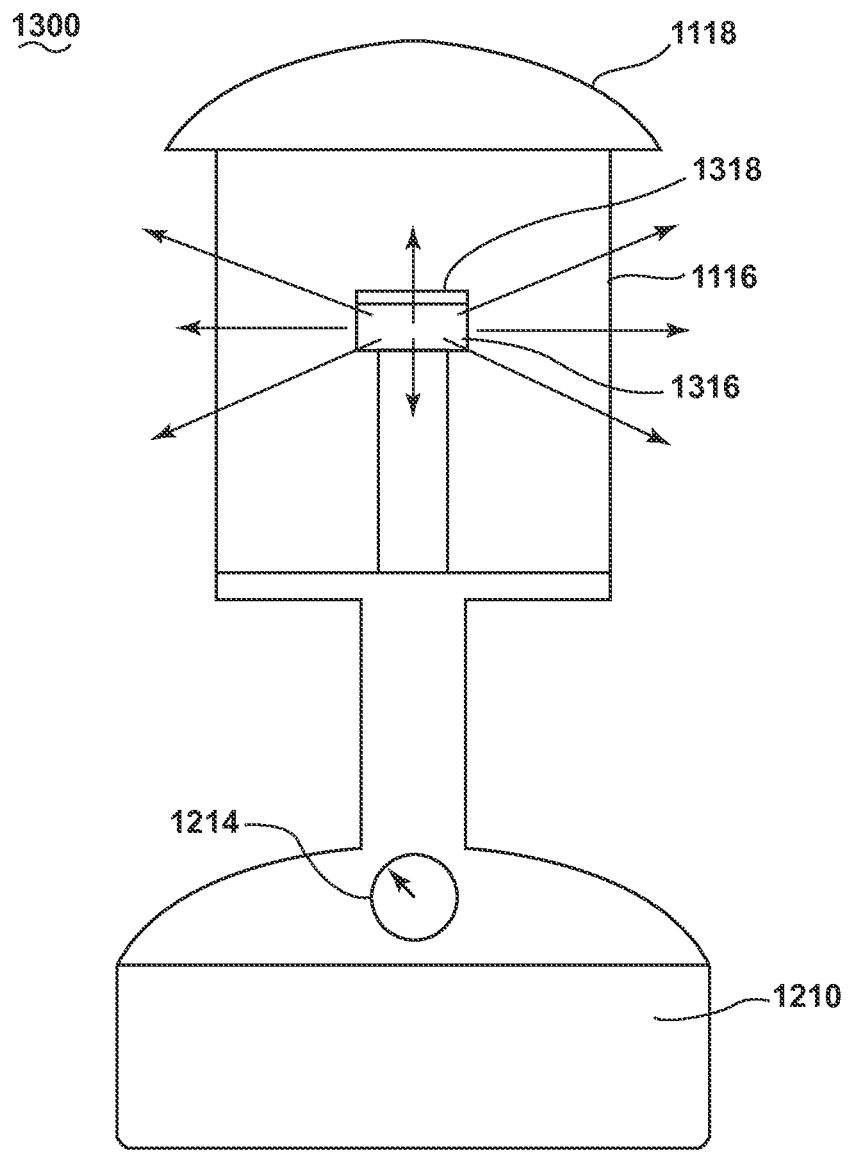
FIG. 19 illustrates a camping lantern with a volumetric optical unit according to an embodiment of the present invention.
Figure 20:
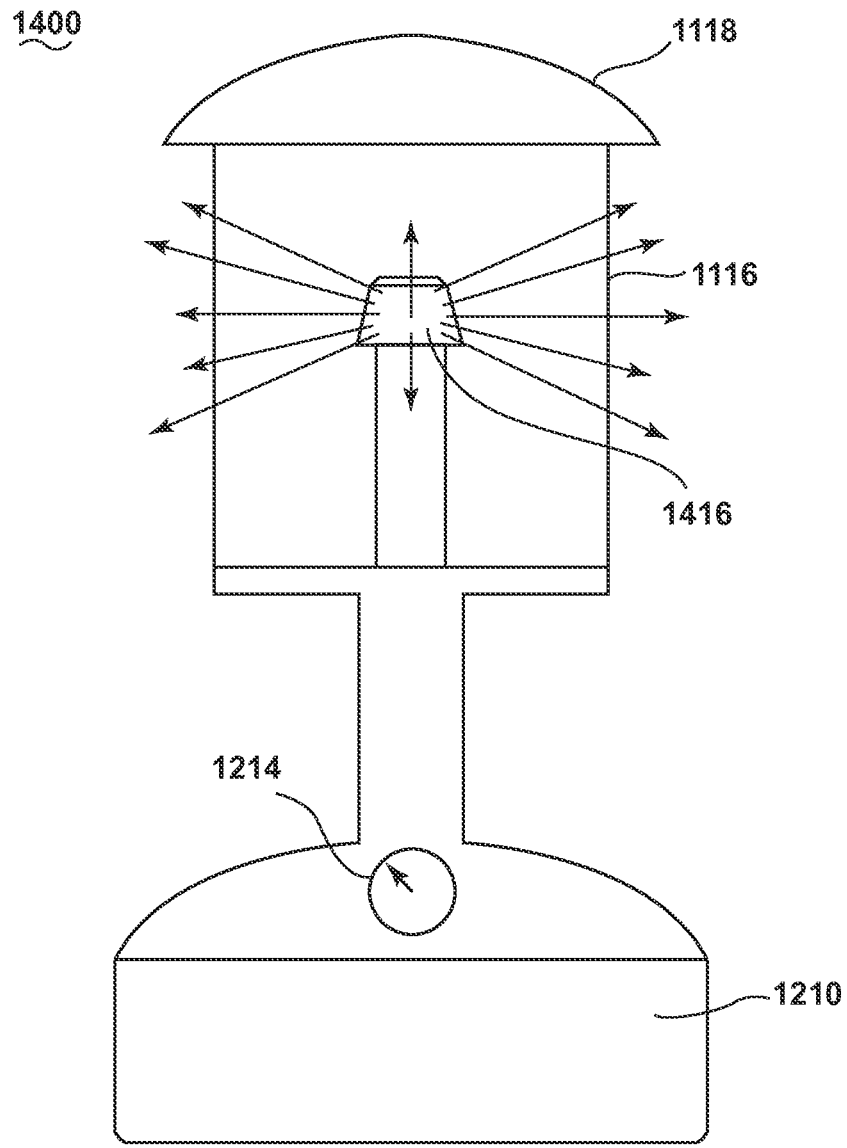
FIG. 20 illustrates a camping lantern with the optical unit in FIG. 3 according to an embodiment of the invention.

FIG. 19 illustrates a camping lantern 1300 with a volumetric optical unit according to an embodiment of the present invention. The volumetric optical unit 1316 may be any of the units with a top reflector 1318 as described above in FIGS. 12-15. FIG. 20 illustrates a camping lantern 1400 with the prior art optical unit 1416 described in FIG. 3 according to an embodiment of the invention.

Figure 21:
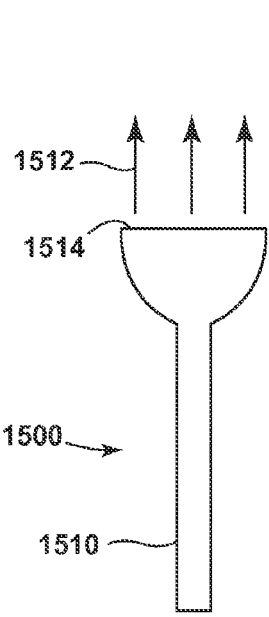
FIG. 21 illustrates a prior art flashlight.
Figure 22:
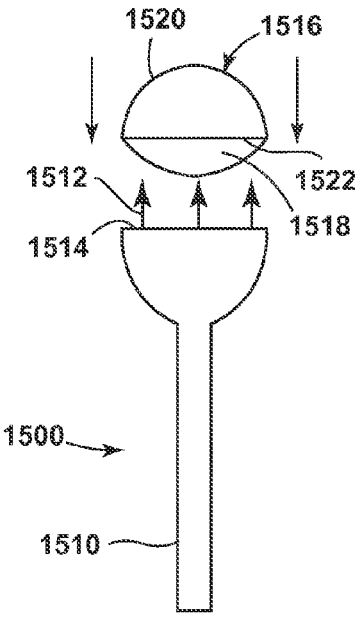
FIG. 22 illustrates attaching a volumetric optical unit to a flashlight according to an embodiment of the invention.

At times it may be desirable for the light emitted from a flashlight not be directional but more isotropic and behave as a lantern with distributed light. By adding a volumetric optical unit to a flashlight similar to the volumetric optical units described above and in US20110215707 entitled "Constrained Folded Path Resonant White Light Scintillator", a flashlight may be converted to a device that emits light in a more isotropic distribution. Consider a flashlight 1500 generically illustrated in FIG. 21. The flashlight 1500 includes a body 1510 that contains a battery compartment for the storage of a battery. The body 1510 is configured to interconnect the battery to a light source 1514. Usually the light source 1514 is a small incandescent light bulb or LED mounted in a reflector and lens and may be configured to direct a narrow beam light 1512. Referring now to FIG. 22, a volumetric optical unit 1516 as described above, particularly in reference to FIGS. 8-11, may be attached to the flashlight 1500.

Figure 23:
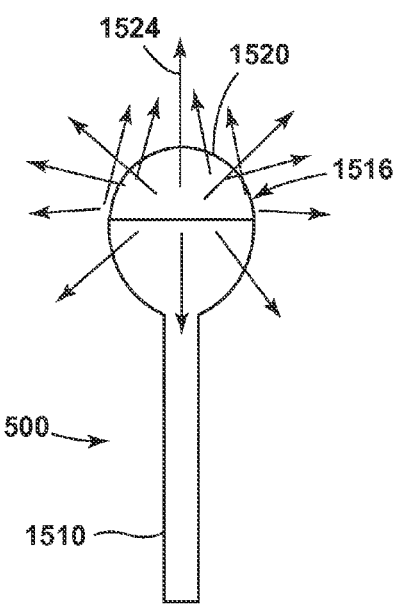
FIG. 23 illustrates a volumetric optical unit attached to a flashlight according to an embodiment of the invention.

As described above, the volumetric optical unit 1516 when configured for placement adjacent to the at least one light source 1514 has a first region 1518 proximal to the light source 1514 and the first region 1518 has a first index of refraction. The volumetric optical unit 1516 may have a second region 1520 abutting the first region with a boundary 1522 defined therebetween. If provided, the second region 1520 may be distal to the light source 1512 and may have a second index of refraction that is less than the first index of refraction. Light emitted from the light source 1514 is scattered as a result of travelling through the first region 1518 and the second region 1520, if provided. The volumetric optical unit 1516 may be mechanically attached and held by friction, molded in snaps or other means. Depending upon the particular configuration and means of attachment, only some top portion of the volumetric optical unit 1516 may be visible when assembled. As shown as a complete assembly in FIG. 23, the flashlight 1500 may be converted from outputting a narrow beam light 1512 to an emitter of an omnidirectional, more isotropic light 1524.

Figure 24:
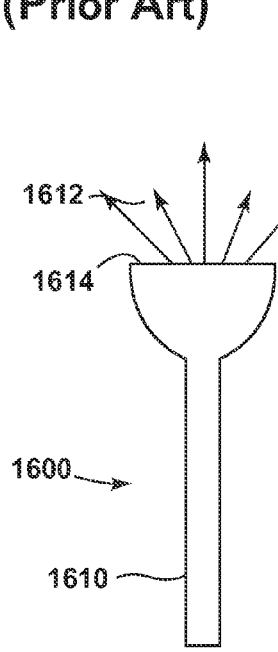
FIG. 24 illustrates a prior art flashlight.
Figure 25:
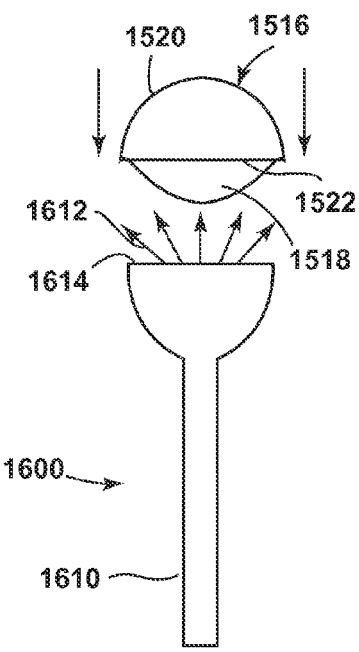
FIG. 25 illustrates attaching a volumetric optical unit to a flashlight according to an embodiment of the invention.
Figure 26:
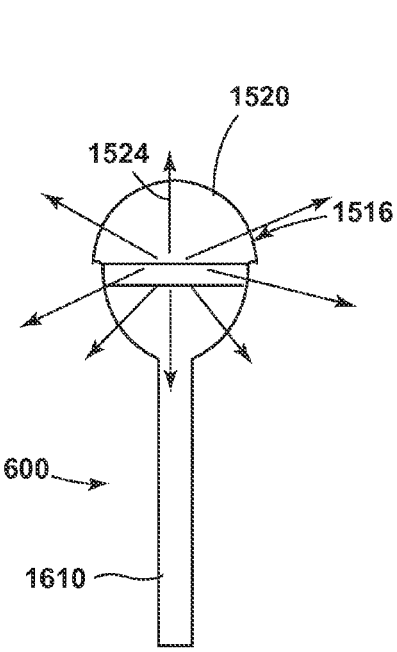
FIG. 26 illustrates a volumetric optical unit attached to a flashlight according to an embodiment of the invention.

Similar results may be achieved by applying the volumetric optical unit 1516 to a flashlight 1600 configured to output a broad beam of light 1612 such as a floodlight. Referring to FIG. 24, the broad beam flashlight 1600 includes a body 1610 that contains a battery compartment for the storage of a battery. The body 1610 is configured to interconnect the battery to a light source 1614. As previously stated, the light source 1614 may be a small incandescent light bulb or LED mounted in a reflector and lens and may configured to direct a broad beam light 1612. Referring now to FIG. 25, the volumetric optical unit 1516 as described above in reference to FIGS. 22 and 23 may be attached to the flashlight 1600 mechanically and held by friction, molded in snaps or other means. As shown as a complete assembly in FIG. 26, the flashlight 1600 may be converted from outputting a broad beam of light 1512 to an emitter of an omnidirectional, more isotropic light 1524.

Figure 27:
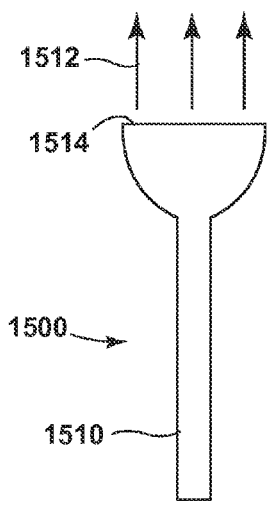
FIG. 27 illustrates a prior art flashlight.
Figure 28:
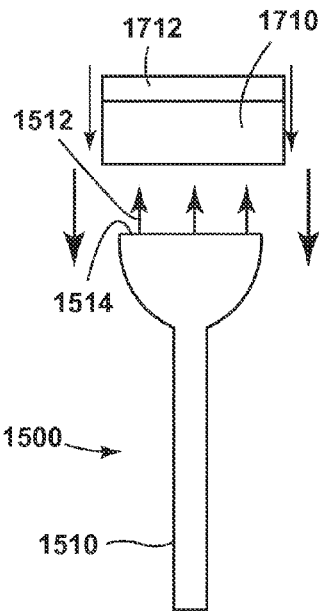
FIG. 28 illustrates attaching a volumetric optical unit to a flashlight according to an embodiment of the invention.
Figure 29:
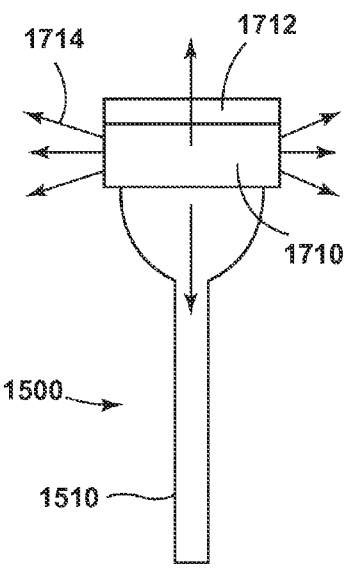
FIG. 29 illustrates a volumetric optical unit attached to a flashlight according to an embodiment of the invention.
Figure 30:
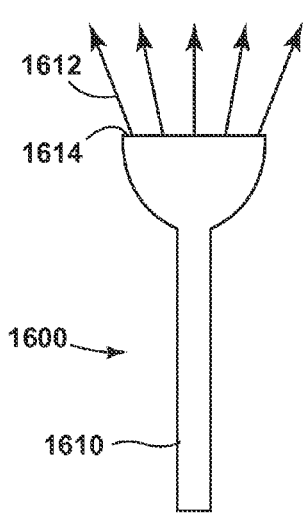
FIG. 30 illustrates a prior art flashlight.
Figure 31:
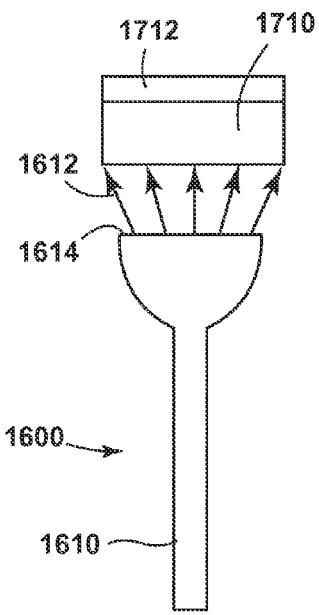
FIG. 31 illustrates attaching a volumetric optical unit to a flashlight according to an embodiment of the invention.
Figure 32:
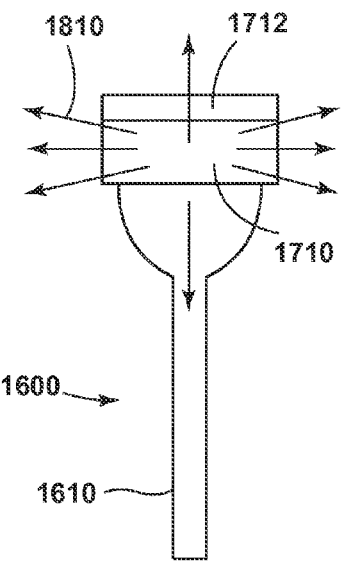
FIG. 32 illustrates a volumetric optical unit attached to a flashlight according to an embodiment of the invention.

FIGS. 27-29 illustrate a conventional flashlight 1500 that is converted from emitting a narrow beam of light 1512 to emitting an omnidirectional, more isotropic light 1714 by attachment of a volumetric optical unit 1710 according to an embodiment of the present invention. The volumetric optical unit 1710 may be any of the units with a top reflector 1712 as described above in FIGS. 12-15. Similarly, FIGS. 30-32 illustrate a conventional flashlight 1600 that is converted from emitting a broad beam of light 1612 to emitting an omnidirectional, more isotropic light 1810 by attachment of a volumetric optical unit 1710 according to an embodiment of the present invention. As previously stated, the volumetric optical unit 1710 may be any of the units with a top reflector 1712 as described above in FIGS. 12-15.

Figure 33:
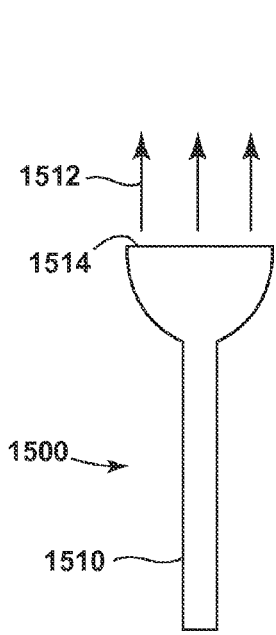
FIG. 33 illustrates a prior art flashlight.
Figure 34:
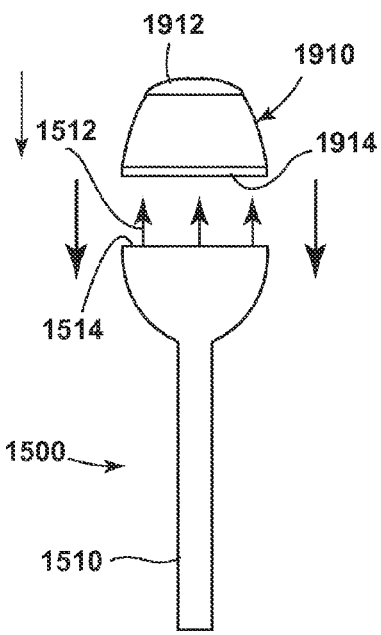
FIG. 34 illustrates attaching a volumetric optical unit to a flashlight according to an embodiment of the invention.
Figure 35:
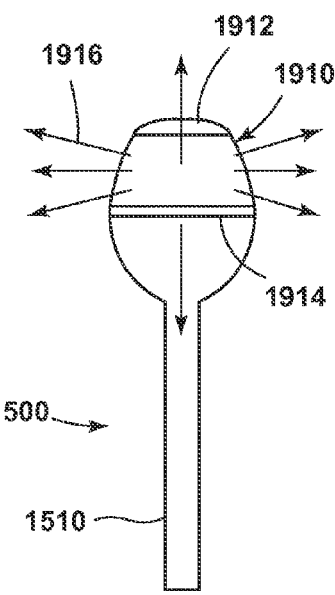
FIG. 35 illustrates a volumetric optical unit attached to a flashlight according to an embodiment of the invention.
Figure 36:
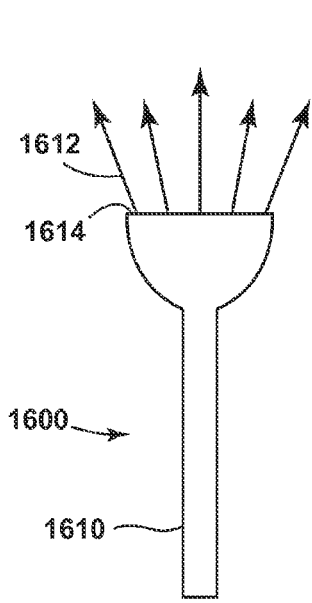
FIG. 36 illustrates a prior art flashlight.
Figure 37:
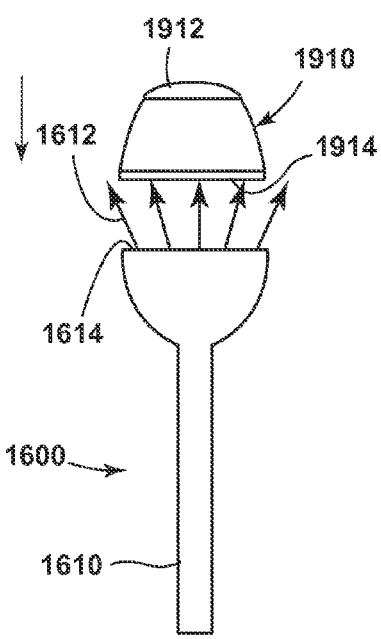
FIG. 37 illustrates attaching the optical unit in FIG. 3 to a flashlight according to an embodiment of the invention.
Figure 38:
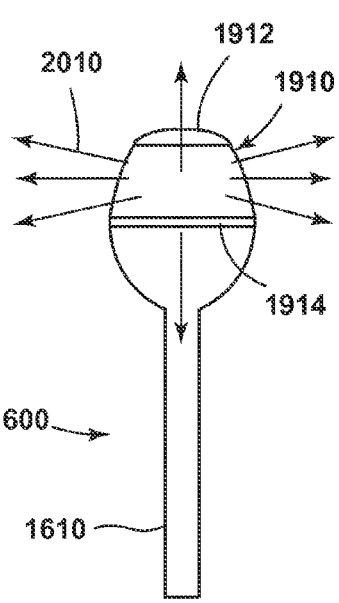
FIG. 38 illustrates the optical unit in FIG. 3 attached to a flashlight according to an embodiment of the invention

Analogous to the integration of a volumetric optical unit of the present invention and described above, FIGS. 33-35 illustrate a conventional flashlight 1500 that is converted from emitting a narrow beam of light 1512 to emitting an omnidirectional, more isotropic light 1916 by attachment of the prior art optical unit 1910 described above in FIG. 3. The optical unit 1910 includes a top reflector 1912 and a bottom reflector 1914 with an aperture for receiving light as described above in FIG. 3. Similarly, FIGS. 36-38 illustrate a conventional flashlight 1600 that is converted from emitting a broad beam of light 1612 to emitting an omnidirectional, more isotropic light 2010 by attachment of the optical unit 1910 shown in FIGS. 34 and 35. The optical unit 1910 may be attached to the flashlight mechanically and held by friction, molded in snaps or by other means.

Figures 39, 40:
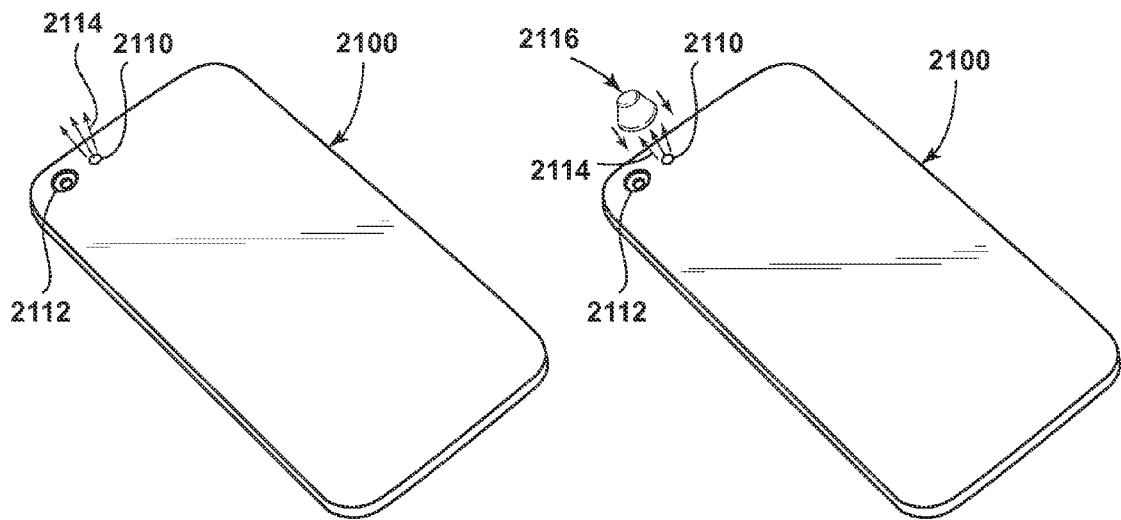
FIG. 39 illustrates a prior art mobile device.
FIG. 40 illustrates attaching a volumetric optical unit to a mobile device according to an embodiment of the invention.
Figure 41:
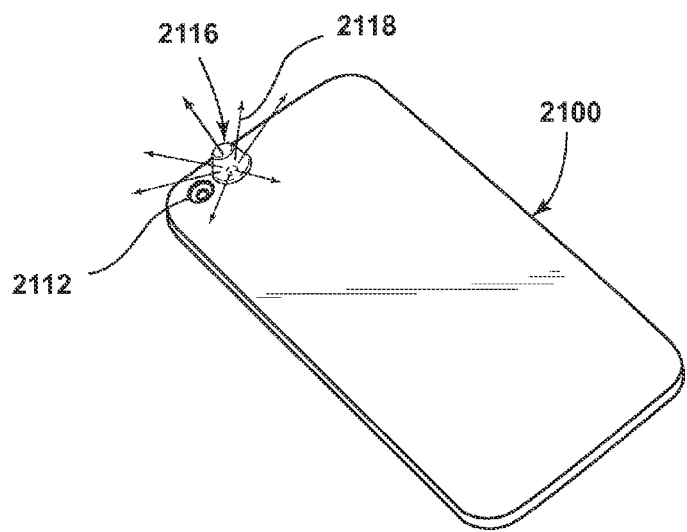
FIG. 41 illustrates a volumetric optical unit attached to a mobile device according to an embodiment of the invention.

FIG. 39 illustrates a mobile device in the form of a mobile telecommunications device such as a smart phone 2100 capable of providing light 2114 by a light source 2110. While many mobile devices include light sources 2110, ostensibly for use as a flash for a camera 2112, the light source 2110, usually in form of an LED, is often co-opted to act as a flashlight. For example, consider the numerous "flashlight" applications available for download for smart phones. The smart phone 2100 is typically formed as a body that contains a battery compartment for the storage of a battery. The body of the smart phone 2100 is configured to interconnect the battery to the light source 2110. The light source 2110 may be adjacent to or integrated into the volumetric optical unit 1216. Referring now to FIGS. 40 and 41, a volumetric optical unit 2116 may be attached to the smart phone 2100 to convert the light 2114 to an omnidirectional, more isotropic light 2118. As described above the volumetric optical unit 2116 is a scattering device associated with the body in register with the light source 2110. Also, as described above and in greater detail in FIGS. 8-11, the volumetric optical unit 2116 when configured for placement adjacent to the light source 2110 has a first region proximal to the light source and the first region has a first index of refraction. The volumetric optical unit 2116 may have a second region abutting the first region with boundary defined therebetween. If provided, the second region may be distal to the light source and may have a second index of refraction that is greater than the first index of refraction. Light emitted from light source is scattered as a result of travelling through the first region and the second region, if provided. The actuation of the light source on the mobile telecommunications device emits light to the scattering device so that the scattering device widely disperses light received from the actuated light source and the mobile telecommunications device can be used as a general purpose lamp. Consequently, the mobile telecommunications device and the light source disposed on the mobile device may be converted to act as a lantern or provide alternative lighting measures for use with the camera 2112.

Any one or more of the following concepts or features may be combined in any combination or permutation to achieve various aspects of the invention:

1. A device for scattering light emitted from at least one light source comprising:
   a volumetric optical unit configured to couple to the at least one light source and having:
   a first region disposed to be proximal to the at least one light source, the first region having a first index of refraction; and
   a second region disposed to be distal to the at least one light source, abutting the first region at a boundary therebetween, and having one of a reflecting medium, a reflector, or a second index of refraction that is different from the first index of refraction;
   whereby light rays emitted from the at least one light source will be scattered as they travel through the first region or the second region or across the boundary.
2. The device of 1 wherein the volume of the first region is smaller than the volume of the second region.
3. The device of 1 wherein the first region comprises a material selected to have the first index of refraction be complementary to the at least one light source.
4. The device of 1 wherein the first index of refraction ranges from about 1.30 and lower to about 1.41.
5. The device of 1 wherein the second index of refraction range from about 1.00 to about 1.59 and higher.
6. The device of 1 wherein the first region has an arcuate outer surface adjacent to the at least one light source.
7. The device of 6 and further comprising a reflector disposed along the arcuate outer surface of the first region for reflecting light emitted from the at least one light source toward the second region.
8. The device of 6 wherein the arcuate surface of the first region is parabolic.
9. The device of 6 wherein the reflector has a surface configured to collimate light impinging on the reflector in a generally parallel fashion toward the second region.
10. The device of 1 wherein the second region has an arcuate outer surface adjacent the at least one light source.
11. The device of 1 wherein the first region comprises a material including at least one of epoxy or silicone.
12. The device of 1 wherein the second region comprises a material including at least one of: air, epoxy or silicone.

13. The device of 1 wherein the second region has a scattering medium distributed throughout the second region for redirecting light travelling through the second region which impinges on the scattering medium.

14. The device of 13 wherein the scattering medium comprises at least one of a phosphor material, generally reflective materials, down-converting phosphors, fluorophores, dyes, quantum dots, or nano-particles.

15. The device of 1 wherein the second region includes at least one phosphor material distributed throughout the second region.

16. The device of 15 wherein the at least one phosphor material is uniformly distributed throughout the second region.

17. The device of 15 wherein the at least one phosphor material comprises less than two percent by weight of the volume of the second region.

18. The device of 15 wherein the at least one phosphor material has a particle size less than 50 µm.

19. The device of 1 wherein the second region has an arcuate outer surface in which the arcuate outer surface is convex with respect to the at least one light source.

20. The device of 19 and further comprising a reflector disposed on at least a portion of the arcuate outer surface of the second region.

21. The device of 1 wherein the second region has an arcuate outer surface in which the arcuate outer surface is concave with respect to the at least one light source.

22. The device of 21 and further comprising a reflector disposed on at least a portion of the arcuate outer surface of the second region.

23. The device of 1 wherein the second region has an inverted conical shape in which a base portion of the conical shape abuts the first region at the boundary therebetween.

24. The device of 1 wherein the height of the first region is greater than or equal to the width of the second region.

25. The device of 1 wherein the second region has a second index of refraction that is less than or equal to the first index of refraction.

26. The device of 1 wherein the second region has a second index of refraction that is greater than or equal to the first index of refraction.

27. A device for scattering light emitted from at least one light source comprising:
   a volumetric optical unit configured to couple to the at least one light source and having:
   a first region disposed to be proximal to the at least one light source, the first region having a first index of refraction, wherein the first region has an arcuate outer surface in which the arcuate outer surface is concave with respect to the at least one light source, and further comprising a reflector disposed on at least a portion of the arcuate outer surface of the first region
   whereby light emitted from the at least one light source is scattered as a result of travelling through the first region and impinging on the reflector disposed on the outer surface of the first region.

28. The device of 27 wherein the first region has a scattering medium distributed throughout the first region for redirecting light travelling through the first region which impinges on the scattering substance.

29. The device of 28 wherein the scattering medium comprises at least one of a phosphor material, generally reflective materials, down-converting phosphors, fluorescents, quantum dots, nano-particles.

30. The device of 27 wherein the first region is provided with at least one phosphor material distributed throughout the first region.

31. The device of 27 wherein the at least one phosphor material is uniformly distributed throughout the first region.

32. The device of 27 wherein the at least one phosphor material comprises less than two percent by weight of the volume of the first region.

33. The device of 27 wherein the at least one phosphor material has a particle size less than 50 µm.

34. An illuminator comprising:
   a body configured to be interconnected to a source of power and having at least one light source carried thereon;
   a scattering device associated with the body in register with the at least one light source, the scattering device comprising a light coupler configured for placement adjacent to the at least one light source having a first region proximal the at least one light source, the first region having a first index of refraction; and a second region abutting the first region defining a boundary therebetween, and being distal to the at least one light source, the second region having a second index of refraction that is less than or equal to the first index of refraction;
   whereby light emitted from the at least one light source is scattered as a result of travelling through the first region and the second region 35. The illuminator of 34 wherein the source of power comprises at least one battery.

36. The illuminator of 35 wherein the body comprises a lantern.

37. The illuminator of 35 wherein the body comprises a flashlight.

38. The illuminator of 35 wherein the body comprises a mobile telecommunications device, the source of power comprises a battery operably interconnected to the mobile telecommunications device, and the light source comprises a light source provided on the mobile telecommunications device and actuatable by controls on the mobile telecommunications device.

39. The illuminator of 38 wherein the scattering device is mounted to a case for the mobile telecommunications device in register with the light source on the mobile telecommunications device, whereby actuation of the light source on the mobile telecommunications device emits light to the scattering device so that the scattering device widely disperses light received from the actuated light source and the mobile telecommunications device can be used as a general purpose lamp.

40. An illuminator comprising:
   a body configured to be interconnected to a source of power and having at least one light source carried thereon;
   a scattering device associated with the body in register with the at least one light source, the scattering device comprising a light coupler configured for placement adjacent to the at least one light source having a first region proximal the at least one light source, the first region having a first index of refraction; and a second region abutting the first region defining a boundary therebetween, and being distal to the at least one light source, the second region having a second index of refraction that is greater than the first index of refraction;

whereby light emitted from the at least one light source is scattered as a result of travelling through the first region and the second region 41. The illuminator of 40 wherein the source of power comprises at least one battery.

42. The illuminator of 40 wherein the body comprises a lantern.

43. The illuminator of 40 wherein the body comprises a flashlight.

44. The illuminator of 40 wherein the body comprises a mobile telecommunications device, the source of power comprises a battery operably interconnected to the mobile telecommunications device, and the light source comprises a light source provided on the mobile telecommunications device and actuatable by controls on the mobile telecommunications device.

45. The illuminator of 44 wherein the scattering device is mounted to a case for the mobile telecommunications device in register with the light source on the mobile telecommunications device, whereby actuation of the light source on the mobile telecommunications device emits light to the scattering device so that the scattering device widely disperses light received from the actuated light source and the mobile telecommunications device can be used as a general purpose lamp.

46. An illuminator comprising:
a body configured to be interconnected to a source of power and having at least one light source carried thereon;
a scattering device associated with the body in register with the at least one light source, the scattering device comprising a light coupler configured for placement adjacent to the at least one light source having a first region proximal the at least one light source, the first region having a first index of refraction; and a second region abutting the first region defining a boundary therebetween, and being distal to the at least one light source, the second region having a second index of refraction that is less than or equal to the first index of refraction;
whereby light emitted from the at least one light source is scattered as a result of travelling through the first region and the second region 47. The illuminator of 46 wherein the source of power comprises at least one battery.

48. The illuminator of 46 wherein the body comprises a lantern.

49. The illuminator of 46 wherein the body comprises a flashlight.

50. The illuminator of 46 wherein the body comprises a mobile telecommunications device, the source of power comprises a battery operably interconnected to the mobile telecommunications device, and the light source comprises a light source provided on the mobile telecommunications device and actuatable by controls on the mobile telecommunications device.

51. The illuminator of 50 wherein the scattering device is mounted to a case for the mobile telecommunications device in register with the light source on the mobile telecommunications device, whereby actuation of the light source on the mobile telecommunications device emits light to the scattering device so that the scattering device widely disperses light received from the actuated light source and the mobile telecommunications device can be used as a general purpose lamp.

52. An illuminator comprising:
a body configured to be interconnected to a source of power and having at least one light source carried thereon;
a scattering device associated with the body in register with the at least one light source, the scattering device comprising a light coupler configured for placement adjacent to the at least one light source having a first region proximal the at least one light source, the first region having a first index of refraction; the first region has an arcuate outer surface in which the arcuate outer surface is concave with respect to the at least one light source, and further comprising a reflector disposed on at least a portion of the arcuate outer surface of the first region;
whereby light emitted from the at least one light source is scattered as a result of travelling through the first region and impinging on the reflector disposed on the outer surface of the first region.

53. The illuminator of 52 wherein the source of power comprises at least one battery.

54. The illuminator of 52 wherein the body comprises a lantern.

55. The illuminator of 52 wherein the body comprises a flashlight.

56. The illuminator of 52 wherein the body comprises a mobile telecommunications device, the source of power comprises a battery operably interconnected to the mobile telecommunications device, and the light source comprises a light source provided on the mobile telecommunications device and actuatable by controls on the mobile telecommunications device.

57. The illuminator of 56 wherein the scattering device is mounted to a case for the mobile telecommunications device in register with the light source on the mobile telecommunications device, whereby actuation of the light source on the mobile telecommunications device emits light to the scattering device so that the scattering device 58. An illuminator comprising:
a body configured to be interconnected to a source of power and having at least one light source carried thereon;
a scattering device associated with the body in register with the at least one light source, the scattering device comprising a light coupler configured for placement adjacent to the at least one light source having a first region proximal the at least one light source, the first region having a first index of refraction; the first region has an arcuate outer surface in which the arcuate outer surface is convex with respect to the at least one light source, and further comprising a reflector disposed on at least a portion of the arcuate outer surface of the first region;
whereby light emitted from the at least one light source is scattered as a result of travelling through the first region and impinging on the reflector disposed on the outer surface of the first region.

59. The illuminator of 58 wherein the source of power comprises at least one battery.

60. The illuminator of 58 wherein the body comprises a lantern.

61. The illuminator of 58 wherein the body comprises a flashlight.

62. The illuminator of 58 wherein the body comprises a mobile telecommunications device, the source of power comprises a battery operably interconnected to the mobile telecommunications device, and the light source comprises a light source provided on the mobile telecommunications device and actuatable by controls on the mobile telecommunications device.

63. The illuminator of 62 wherein the scattering device is mounted to a case for the mobile telecommunications device in register with the light source on the mobile telecommunications device, whereby actuation of the light source on the mobile telecommunications device emits light to the scattering device so that the scattering device widely disperses light received from the actuated light source and the mobile telecommunications device can be used as a general purpose lamp.

This written description uses examples to disclose the invention, including the best mode, and also to enable any person skilled in the art to practice the invention, including making and using any devices or systems. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A device for scattering light emitted from at least one light source comprising:
   a volumetric optical unit configured to couple to the at least one light source and having:
   a first region disposed to be proximal to the at least one light source, the first region having a first index of refraction; and
   second region disposed to be distal to the at least one light source, abutting the first region at a boundary therebetween, and having one of a reflecting medium or a reflector;
   whereby light rays emitted from the at least one light source will be scattered in a general isotropic distribution as they travel across the boundary and within the second region.

2. The device of claim 1 wherein the first region comprises a material selected to have the first index of refraction be complementary to the at least one light source.

3. The device of claim 1 wherein the first index of refraction ranges from about 1.30 and lower to about 1.41.

4. The device of claim 1 wherein the second region has an second index of refraction range from about 1.00 to about 1.59 and higher.

5. The device of claim 1 wherein the first region has an arcuate outer surface adjacent to the at least one light source.

6. The device of claim 5 wherein a reflector is disposed along the arcuate outer surface of the first region for reflecting light emitted from the at least one light source toward the second region.

7. The device of claim 1 wherein the second region has an arcuate outer surface.

8. The device of claim 1 wherein the first region comprises a material including at least one of epoxy or silicone.

9. The device of claim 1 wherein the second region comprises a material including at least one of: air, epoxy or silicone.

10. The device of claim 1 wherein the second region has a reflective medium distributed throughout the second region for redirecting light travelling through the second region which impinges on the reflective medium.

11. The device of claim 1 wherein the second region has an arcuate outer surface in which the arcuate outer surface is convex with respect to the at least one light source.

12. The device of claim 1 and further comprising a reflector disposed on at least a portion of the arcuate outer surface of the second region.

13. The device of claim 1 wherein the second region has an inverted conical shape in which a base portion of the conical shape abuts the first region at the boundary therebetween.

14. The device of claim 1 wherein the height of the second region is greater than or equal to the width of the first region.

15. The device of claim 1 wherein the second region has a second index of refraction that is less than or equal to the first index of refraction.

16. The device of claim 1 wherein the second region has a second index of refraction that is greater than or equal to the first index of refraction.

17. A device for scattering light emitted from at least one light source comprising:
   a volumetric optical unit configured to couple to the at least one light source and having:
   a first region disposed to be proximal to the at least one light source, the first region having a first index of refraction, wherein the first region has an arcuate outer surface in which the arcuate outer surface is concave with respect to the at least one light source, and further comprising a reflector disposed on at least a portion of the arcuate outer surface of the first region
   whereby light emitted from the at least one light is scattered as a result of travelling through the first region and impinging on the reflector disposed on the outer surface of the first region.

18. The device of claim 17 wherein the first region has a scattering medium distributed throughout the first region for redirecting light travelling through the first region which impinges on the scattering substance.

19. The device of claim 18 wherein the scattering medium comprises at least one of a phosphor material, generally reflective materials, down-converting phosphors, fluorescents, quantum dots, nano-particles.

* * * * *